US010724696B2

(12) United States Patent
Rasmussen

(10) Patent No.: US 10,724,696 B2
(45) Date of Patent: Jul. 28, 2020

(54) LED PROJECTING LIGHT FIXTURE WITH ADDITIONAL LIGHT EFFECTS

(71) Applicant: Harman Professional Denmark ApS, Aarhus N. (DK)

(72) Inventor: Niels Jørgen Rasmussen, Egaa (DK)

(73) Assignee: Harman Professional Denmark ApS, Aarhus N. (DK)

( * ) Notice: Subject to any disclaimer, the term of this patent is extended or adjusted under 35 U.S.C. 154(b) by 0 days.

(21) Appl. No.: 15/763,006

(22) PCT Filed: Sep. 21, 2016

(86) PCT No.: PCT/DK2016/050304
§ 371 (c)(1),
(2) Date: Mar. 23, 2018

(87) PCT Pub. No.: WO2017/054823
PCT Pub. Date: Apr. 6, 2017

(65) Prior Publication Data

US 2018/0283632 A1    Oct. 4, 2018

(30) Foreign Application Priority Data

Sep. 28, 2015 (DK) ................................ 2015 70613

(51) Int. Cl.
*F21S 10/00* (2006.01)
*G03B 25/00* (2006.01)
(Continued)

(52) U.S. Cl.
CPC ............ *F21S 10/007* (2013.01); *F21V 11/08* (2013.01); *F21V 13/02* (2013.01); *F21V 14/08* (2013.01);
(Continued)

(58) Field of Classification Search
CPC ................................. F21S 10/007; G03B 25/00
See application file for complete search history.

(56) References Cited

U.S. PATENT DOCUMENTS 1,787,333 A     12/1930  Abel
5,045,983 A *   9/1991   Shields ................ H05B 37/029
                                                362/268
(Continued)

FOREIGN PATENT DOCUMENTS

CN    103244898 A    8/2013
EP    1 835 223 A1   9/2007

OTHER PUBLICATIONS

International Search Report for Application No. PCT/DK2016/050304, dated Feb. 28, 2017, 7 pages.
(Continued)

*Primary Examiner* — Alexander H Taningco
*Assistant Examiner* — Pedro C Fernandez
(74) *Attorney, Agent, or Firm* — Artegis Law Group, LLP

(57) ABSTRACT

The present invention relates to a projecting light fixture comprising at least one LED generating light beam and a projecting system positioned configured to project the light beam along an optical axis. A beam shaping object is arranged between the LED and the projecting system and comprises a least two different beam shaping patterns, which can be arranged in the source light beam upon rotation of the beam shaping object in relation to the light beam. An actuator is configured to continuously rotate the beam shaping object in relation to the source light beam in order to alternately arrange the beam shaping patterns in the light beam. The projecting light fixture comprises a synchronizer providing a synchronizing signal indicative of: the rotation speed and/or the angular position of the beam shaping object; the position of beam shaping patters in relation to the
(Continued)

light beam. Where a controller is configured to toggle the LED between a LED on-period and a LED off-period based on the synchronizing signal.

25 Claims, 15 Drawing Sheets

(51) Int. Cl.
| | |
|---|---|
| *G03B 21/00* | (2006.01) |
| *F21V 11/08* | (2006.01) |
| *F21V 13/02* | (2006.01) |
| *F21V 14/08* | (2006.01) |
| *F21V 23/04* | (2006.01) |
| *F21W 131/406* | (2006.01) |
| *F21Y 115/10* | (2016.01) |

(52) U.S. Cl.
CPC ........ *F21V 23/0407* (2013.01); *G03B 21/001* (2013.01); *G03B 25/00* (2013.01); *F21W 2131/406* (2013.01); *F21Y 2115/10* (2016.08)

(56) References Cited

U.S. PATENT DOCUMENTS

| | | | |
|---|---|---|---|
| 5,665,305 A * | 9/1997 | Belliveau | F21S 10/007 359/234 |
| 2002/0015305 A1 | 2/2002 | Bornhorst et al. | |
| 2005/0213041 A1 | 9/2005 | Schmelzer | |
| 2010/0201949 A1* | 8/2010 | Barnett | G03B 25/00 352/101 |
| 2013/0038736 A1 | 2/2013 | Yamamura | |
| 2013/0208479 A1 | 8/2013 | Allan | |
| 2013/0294080 A1* | 11/2013 | Hansen | F21S 10/00 362/271 |
| 2014/0313779 A1 | 10/2014 | Higgins et al. | |
| 2015/0176813 A1 | 6/2015 | De Vaan | |

OTHER PUBLICATIONS

Extended European Search Report for application No. 16850410.8 dated Mar. 28, 2019.

* cited by examiner

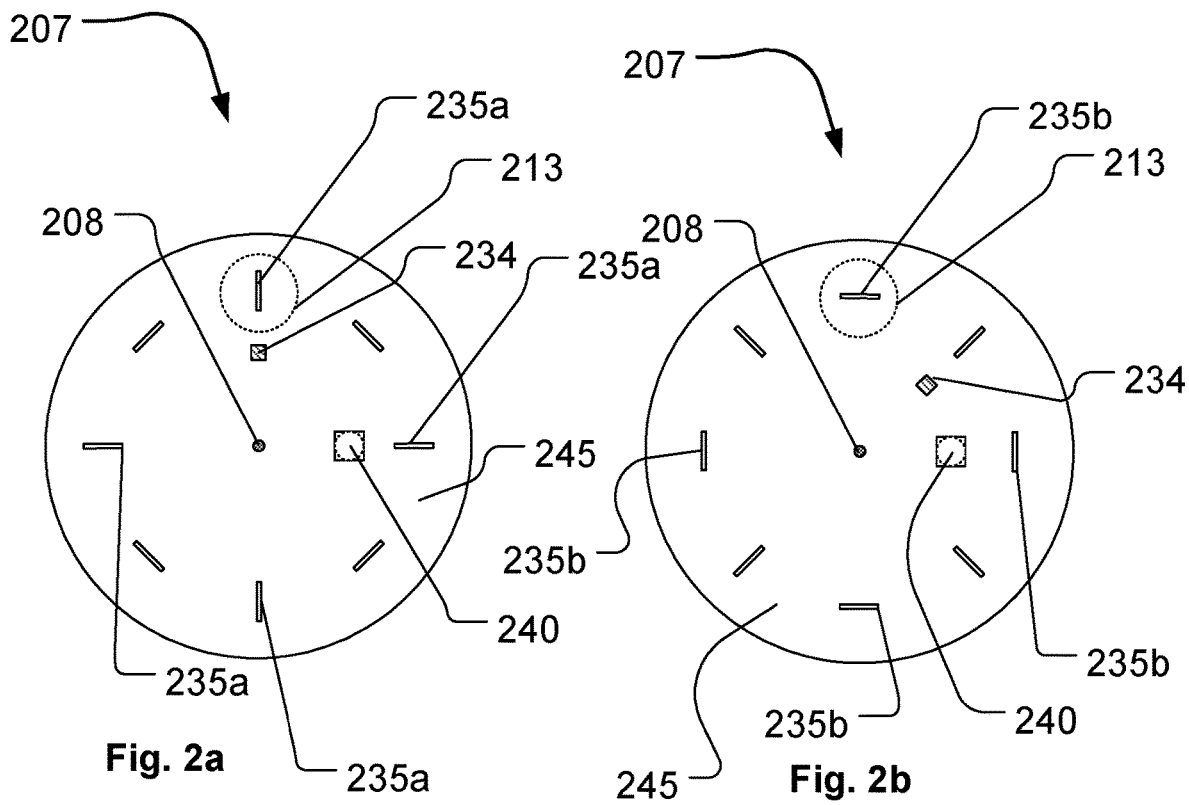
Fig. 2a
Fig. 2b
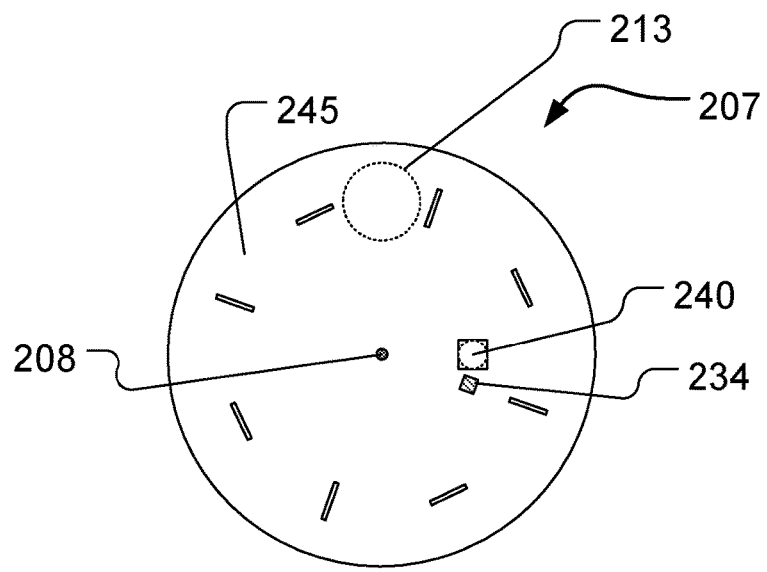
Fig. 2c

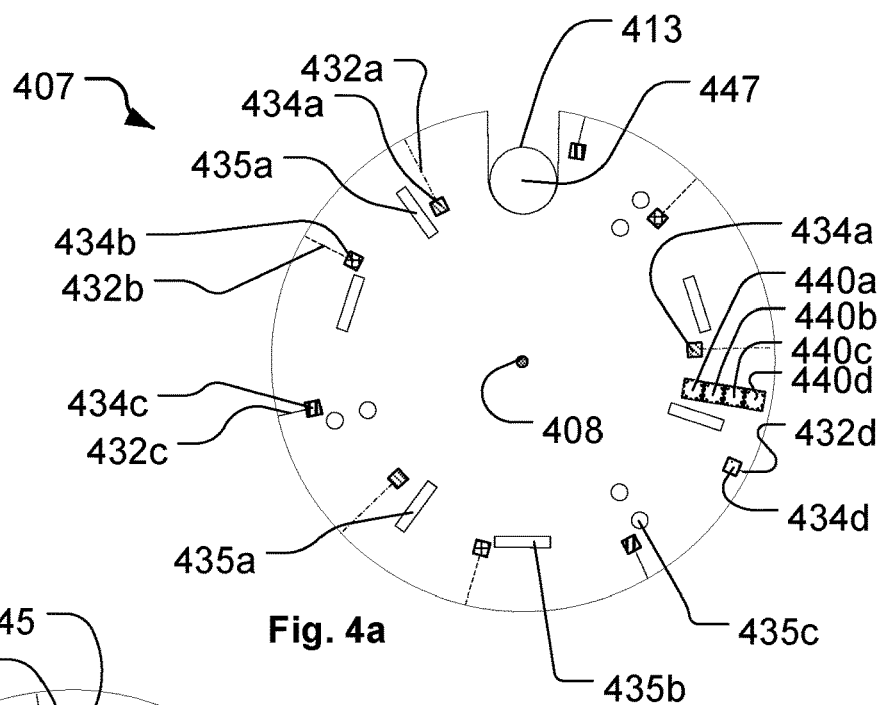
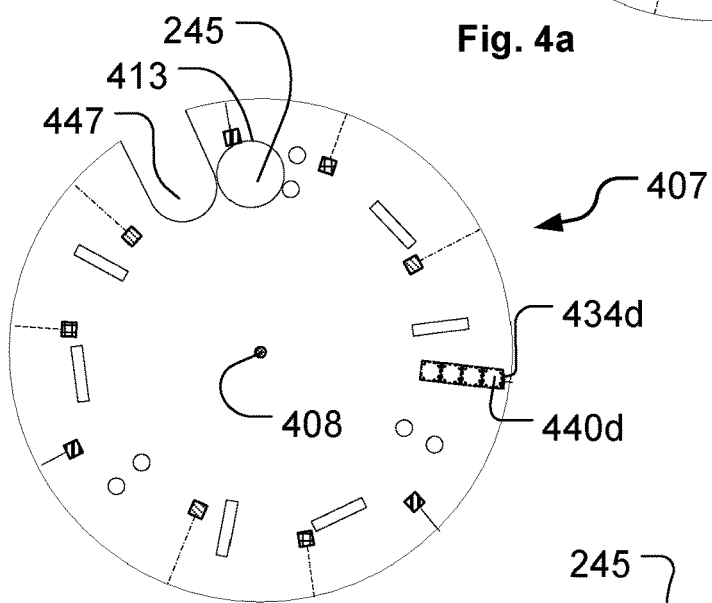
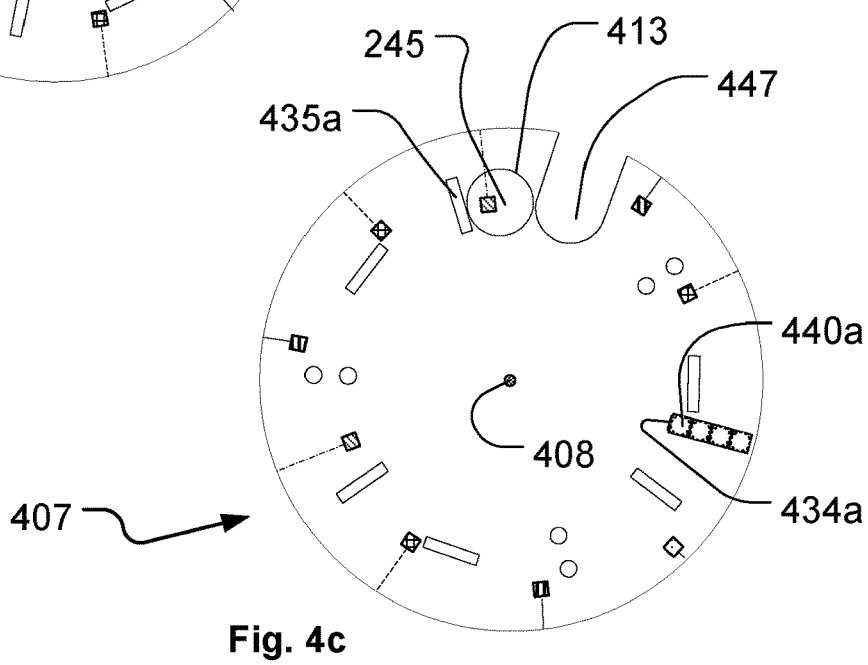
Fig. 4a
Fig. 4b
Fig. 4c

LED PROJECTING LIGHT FIXTURE WITH ADDITIONAL LIGHT EFFECTS

CROSS-REFERENCE TO RELATED APPLICATIONS

The present application is a national stage application of the international application titled, "LED PROJECTING LIGHT FIXTURE WITH ADDITIONAL LIGHT EFFECTS," filed on Sep. 21, 2016 and having application number PCT/DK2016/050304, which claims the priority to Denmark Patent Application having Application Number PA 2015 70613, filed on Sep. 28, 2015. The subject matter of these related applications is hereby incorporated herein by reference.

FIELD OF THE INVENTION

The present invention relates to a LED projecting light fixture where an optical gate is illuminated by at least one LED and where a projecting system is configured to project the light passing through the optical gate along a primary optical axis. A beam shaping object is arranged near the optical gate and is configured to modify the light beam.

BACKGROUND OF THE INVENTION

In order to create various light effects and mood lighting in connection with concerts, live shows, TV shows, sport events or as a part of an architectural installation light fixtures creating various light effects are getting more and more used in the entertainment industry. Typically entertainment light fixtures creates a light beam having a beam width and a divergence and can for instance be wash/flood light fixtures creating a relatively wide light beam or it can be projecting fixtures configured to projecting images onto a target surface.

Projecting light fixtures comprises an optical gate illuminated by a light source module and an optical projecting system is configured to collect light passing through the optical gate along a primary optical axis. A beam shaping object is often arranged at the optical gate and is used to shape the light beam. The beam shaping object can be used to create midair effects (visible due to light scattering in/on smoke/haze in the air) where the shape of the light beam in midair is defined by the beam shaping object and/or the beam shaping object can create a light pattern which is projected to and imaged on a target surface. The beam shaping object can be any object capable of the modifying the light beam and can for instance be GOBOs, Animation wheels, frost filters, color filters, prisms, framing blades, iris, textured glass, etc. The beam shaping objects can be used as static objects arranged in the light beam and/or as movable objects which are moved in relation to the light beam in order to create a dynamic light effect. Additionally it is known to use a digital imaging device such as DMDs, LCDs or the like as beam shaping objects whereby the projected light beam can be used as a digital projector, for instance in order to project graphical images and/video signals.

Light designers and programmers want as many effects as possible in a lighting apparatus as this give the light designer and programmers many options when creating light shows. However it is difficult to provide a lighting apparatus with many effects as each kind of the light effect components take up space in the lighting apparatus. Especially it is difficult to provide many light effects in projecting light devices as the light forming element need to be positioned in a focal point (the optical gate) of the optical system, and typical optical systems are only capable of focusing in a very limited area. At the same time it is also desired to have light and compact light fixtures as these are easier to handle. Additionally light designers and programmers also want new light effects which can be used to create light shows.

US20100201949 discloses an interactive zoetrope comprising a control system controlling a light assembly, a disk that is coupled a motor and may rotate at a predetermined velocity V (e.g., 20 to 30 RPS, or more). The disk includes a plurality of images disposed on an at least partially light transmissive base (e.g., slides) that depict a series of faces with different facial expressions. In operation, the light assembly, which may include an output objective lens (not shown) to focus the light from light assembly having passed through disk, is used to selectively illuminate one or more of the slides during each revolution of the disk in such a way that an animated image appears on a projection surface. This Zoetrope system can only provide zoetrope effects and cannot be used for illumination purposes and midair effects.

DESCRIPTION OF THE INVENTION

The objective of the present invention is to solve the limitations of the prior art described above and providing a compact projecting light fixture capable of creating a bright illumination and new light effects. This can be achieved by a projecting light fixture and method as defined by the independent claims. The benefits and advantages of the present invention are disclosed in the detailed description of the drawings illustrating the invention. The dependent claims define different embodiments of the invention.

DESCRIPTION OF THE DRAWING

FIGS. 2a-2c illustrate different positions of a beam shaping object in relation to the source light beam in the projecting light fixture according to the present invention;

FIGS. 4a-4c illustrate different positions of another embodiment of a beam shaping object in relation to the source light beam in the projecting light fixture according to the present invention;

DETAILED DESCRIPTION OF THE INVENTION

The present invention is described in view of exemplary embodiments only intended to illustrate the principles of the present invention. The skilled person will be able to provide several embodiments within the scope of the claims. In the illustrated embodiments the illustrated light beams and optical components do only serve to illustrate the principles of the invention rather than illustrating exact and precise light beams and optical components. Throughout the description the reference numbers of similar elements providing similar effects have been given the same last two digits.

Figure 1:
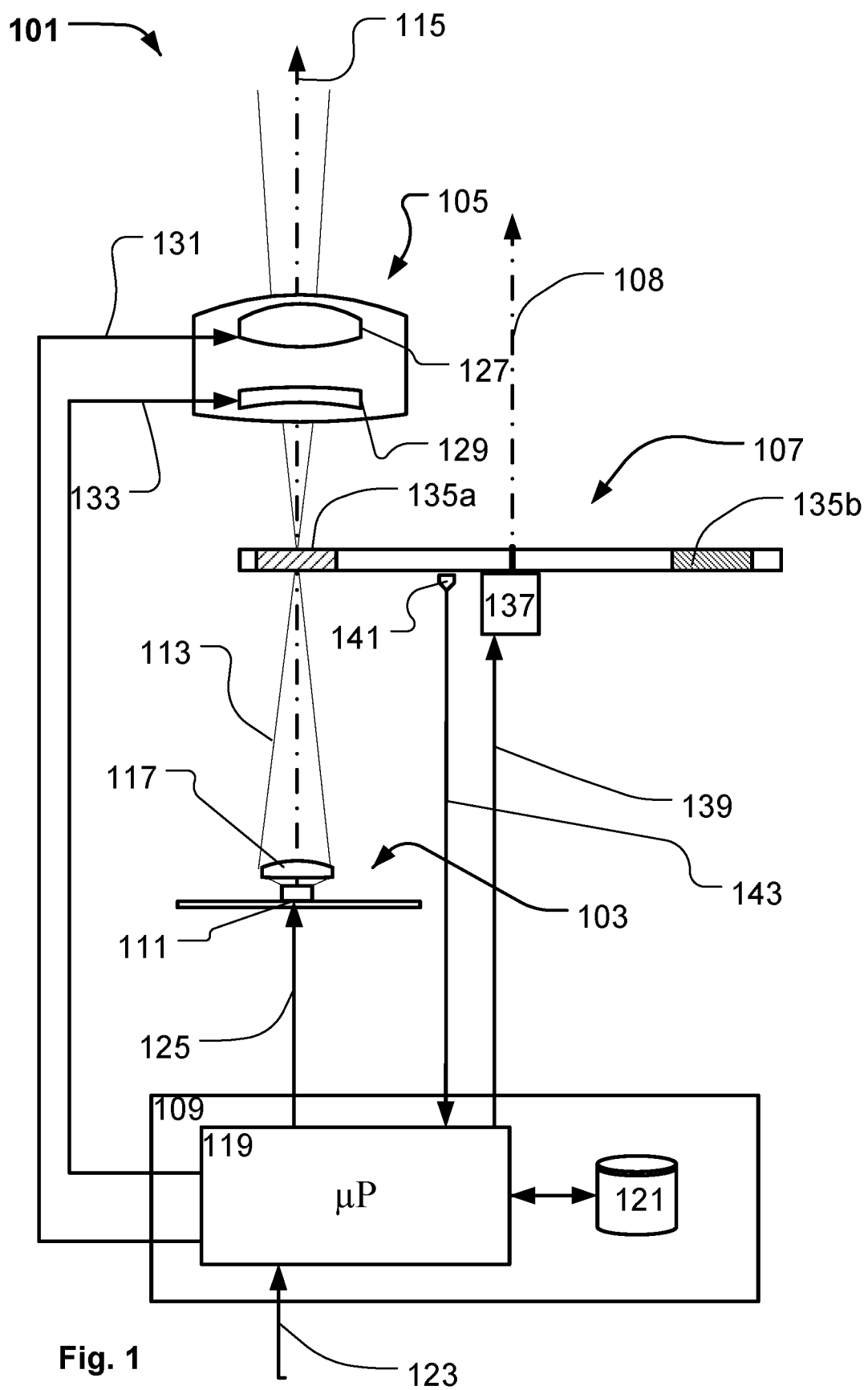
FIG. 1 illustrates a structural diagram a projecting light fixture according to the present invention.

FIG. 1 illustrates a structural diagram of a projection light fixture 101 according to the present invention. The light fixture comprises a light source module 103, a projecting system 105, a beam shaping object 107 and a controller 109.

The light source module 103 comprises at least one LED 111 generating at least one source light beam 113 (illustrated as dotted line) propagating along a primary optical axis 115 (illustrated as dash dotted arrow). In the illustrated embodiment the light source module comprises a light collector 117 configured to collect light from the LED and convert the collected light into the source light beam. The light collector can be any optical component capable of collecting light from the LED and converting the collected light into a source light beam, for instance optical lenses, TIR lenses, light rods etc. It is to be understood that the light collector can be configure to collect light from any positive number of LEDs and the light collector can thus be adapted to collect light from a single LED or a plurality of LEDs. It the illustrated embodiment only one LED 111 and corresponding light collector 117 have been indicated, however it is noticed that in alternative embodiments a plurality of LEDs can be provided where each LED provides a source light beam and where the light source module is configured to concentrate the source light beams at an optical gate. The gate can be delimited by an aperture, however it to be understood that a physical aperture can be omitted and that the beam shaping device also can constitute an aperture.

The controller 109 is configured to control the projecting light fixture and the components of the projecting light fixture. The controller comprises a processor 119 and a memory 121 and is configured to control the light fixture based on an input signal 123 indicative of a plurality of light control parameters specifying how the projecting light fixture should be controlled. The input signal 123 can be any signal capable of communicating parameters and can for instance be based on one of the following protocols USITT DMX 512, USITT DMX 512 1990, USITT DMX 512-A, DMX-512-A including RDM as covered by ANSI E1.11 and ANSI E1.20 standards, Wireless DMX, Artnet or ACN designates Architecture for Control Networks; ANSI E1.17, E1.31. The control parameters can also be generated from a user interface either implemented as a part of the projecting light fixture or implemented on an external controller which sends the light control parameters to the projecting light fixture through the input signal 123. The control parameter can also be obtained from a pre stored program in the memory 121.

The controller is configured to control the LED 111 through communication line 125 and can turn the LED on and off as desired. Additionally the controller can also be configured to regulate the intensity the light emitted by the LED sources for instance by using PWM, AM, FM, binary signals, DC signals etc. The skilled person will be able to provide many kind of communication lines between the controller and the LED for instance by providing a driver which generates an activation signals for the LED based on a control signal from the controller. In embodiments with a plurality of LEDs the LEDs can be connected to the same data bus and controlled by the controller through a data bus using addressing. The LEDs can be controlled based on the same control signal from the controller or controlled by the same driver.

The projecting system 105 comprises a positive number of optical components and is configured to collect light modified by the beam shaping object 107 and project the light collected along the primary optical axis 115. The projecting system can be configured to adjust the beam width and/or divergence of the light beam exiting the projecting system and can be adjusted to image a beam shaping object arranged near the optical gate at a target surface along the optical axis. In the illustrated embodiment the projecting system comprises an optical zoom group 127 and an optical focus group 129. The optical zoom group comprises at least one optical component and is configured to adjust the divergence and/or beam width of the light beam. The optical focus group comprises at least one optical component and is configured to focus the image of the beam shaping object at a target surface along the primary optical axis. The projecting system can also be provided as a fixed group of optical components having predefined focus and zoom properties. There is at least one optical component of the optical zoom group and/or the optical focus group can be any optical component known in the art of optics such as lenses, prisms, reflectors, etc.

In the illustrated embodiment the optical zoom group and optical focus group are movable in relation to the primary optical axis and the controller is configured to control the position of the optical zoom group 127 and the optical focus group along the primary optical axis respectively through communication line 131 and 133. The zoom group and focus group is moved along the optical axis using actuators (not shown) as known the art of entertainment lighting. The controller can be configured to control the optical zoom group based on a first zoom level parameter, where the first zoom level parameter is indicative of the zoom level of the projected light beam. The zoom level parameter can be obtained from the memory 121, from an input signal 123 or from a user interface (not shown). The controller can also be configured to control the optical focus group based on a focus parameter. The focus parameter can be indicative of the distance where the image of the beam shaping object shall be focused, be determined based on the zoom level parameter and/or indicate if a defocused image are to be provided. The controller can further be configured to determine the focus level parameter based on the zoom level parameter, e.g. in order to maintain the same focusing during a zoom operation. In one embodiment the optical focus group is movable between a focusing position and a de-focusing position, where in the focusing position the optical focus group is configured to image the beam shaping object at a target surface along the primary optical axis and where in the de-focusing position the optical focus group is configured to provide a defocused image of the beam shaping object. It is to be understood that the optical zoom group and focus groups can be stationary groups providing fixed zoom and focus.

The beam shaping object 107 is arranged between the LED 111 and the projecting system 107 and comprises a first beam shaping pattern 135a and a second beam shaping pattern 135b, where the first beam shaping pattern and second beam shaping pattern are different. It is to be understood that the beam shaping object can comprise additional beam shaping patterns different from the first and second beam shaping patterns and/or additional copies of the first and second beam shaping pattern. The at least two different beam shaping patterns are illustrated as different hatchings but will be illustrated in further detail in FIGS. 2a-c, 4a-c and 6. The beam shaping object is rotatable by an actuator 137 around an axis 108 offset in relation to the primary optical axis 115 and the two different beam shaping patterns can alternately be arranged in the source light beam by rotating beam shaping object.

The beam shaping patterns can be any pattern capable of shaping the source light beam and can for instance be gobos provided as transparent patterns provided in a non-transparent material, where illumination of the beam shaping pattern results in the fact that light pass through the transparent material while been blocked by the non-transparent material. The non-transparent material can for instance be provided as a metal plate where the transparent patterns are provided as cut-outs in the metal plate. Alternatively the beam shaping object can be provided as a transparent plate where the non-transparent areas are provided as coatings on the transparent plate. The transparent plate can for instance be made of glass, polymers, silicone. Also it is possible to provide the transparent and non-transparent patterns as color filter having different color filtering properties, whereby it is possible to create colored light patterns. The beam shaping patterns can also be provided as textured glass gobos.

The actuator is configured to continuously rotate the beam shaping object in order to alternately arrange the two different beam shaping patterns 135a and 135b in the source light beam. Continuously rotation of the beam shaping object results in the fact that the two different beam shaping patterns 135a and 135b alternately is arranged in the source light beam. In the illustrated embodiment the controller is configured to control the actuator 137 through a communication line 139 for instance in order to start and stop the rotation of the beam shaping object, increase and decrease the rotation speed, change direction of rotation, and/or stop the rotation of the beam shaping device such that a certain beam shaping pattern is arranged in the source light beam.

The projecting light fixture comprises a synchronizer 141 configured to provide a synchronization signal 143 to the controller. The synchronization signal 143 is indicative of at least one of the parameters the rotation speed of the beam shaping object, the angular position of the beam shaping object; the position of the first beam shaping pattern in relation to the source light beam and the position of the second beam shaping pattern in relation to the source light beam. The rotation speed of the beam shaping object indicates how fast the beam shaping object rotates around its rotation axis 108 and can be provided as the number of revolutions that the beam shaping object performs within a given time frame, for instance revolutions pr. minute (RPM) or revolutions pr. second (RPS). The rotation speed of the beam shaping object can also be provided as the angular speed of the beam shaping object either as an instant speed or as average angular speed over a given time frame. The positions the first beam shaping pattern and the second beam shaping pattern can for instance a synchronization signal indicating every time the first beam shaping pattern and the second beam shaping pattern are positioned at a certain position in relation to the source light beam, for instance the synchronization signal can proved an indication every time the beam shaping patterns are positioned inside the source light be, every time the beam shaping patterns are about the enter the source light beam, every time the beam shaping patterns has just left the source light beam. The synchronization signal can also be indicative of the angular position of the beam shaping object in relation to its rotation axis, for instance the synchronization signal can indicate every time the beam shaping object passes a certain angular position or it can indicate the angular position of the beam shaping object in relation to a reference angular position.

Additionally the controller is configured to toggle the LED 111 between an on-period and an off-period based on the synchronizing signal 143, where the LED is turned on in the on-period and turned off in the off-period.

The projecting light fixture according to the present invention makes it possible to create a large number of light effects. This is achieved by continuously rotating the beam shaping object and results in the fact that at the least two different beam shaping patterns alternately are arranged in the light beam at a very high speed. Further by toggling the LED between an on-period and an off-period makes it possible to illuminate the beam shaping patterns when they are arranged in the light beam, as a consequence the light pattern created by the beam shaping pattern can be projected along the primary optical axis. The rotation of the beam shaping object makes it possible to alternate between different beam shaping patterns very fast. Toggling the on-period and off period based on the synchronizing signal makes it possible to very accurately to control the illumination of the beam shaping patterns with the actual rotation of the beam shaping device. This very accurately control of the illumination in relation to the rotation of the light beam shaping device makes it possible to create a large variety of light effect as the illumination of the light beam shaping object can be timed in order to illuminate the two different beam shaping patterns in many ways whereby different light effects can be created. In situations where the beam shaping object rotates so fast that the two different beam shaping patterns is alternately arranged in the source light beam at a speed faster than a human observer can see, it becomes possible to combine the two light patterns created by the beam shaping patterns into an combined illumination, which is observed by a human a one supposed light pattern. For instance the beam shaping object can be rotated at a speed alternately arranging the beam shaping patterns in the source light beam at a speed faster than a human will be able to can pensive as different images. In many cases is sufficient to rotate the beam shaping object a speed arranging the different beam shaping objects at a rate faster than 100 frames per second, where a frame corresponds to the image created be the gobo patterns.

The synchronizing between the beam shaping object and the LEDs can for instance be performed such that the on-periods are activated every time one of the two different light beam patterns are arranged in the light beam, and such that the off periods are activated when an opaque area between the two different beam shaping patterns are in the light beam.

Additionally controlling the on-period and off-period based on the synchronization signal makes it possible to adjust the duration of the on-period in real time and control how long time the different beam shaping patterns are illuminated when they are arranged in the source light beam. For instance by providing a longer on-period result is a stretched/blurred image of the beam shaping pattern is created.

Adjusting when the on-period starts based on the synchronization signal makes it possible to move the beam shaping pattern within the illumination spot. For instance when the on-period starts as a soon as the beam shaping pattern is entered into the light beam results in a light pattern is created at the beginning (one side) of the illumination spot, whereas if the on-period starts when the beam shaping pattern is in the middle of the light beam results in a light pattern that is created in the middle of the illumination spot, and later start of the on-period moves the light pattern towards the other side of the illumination spot.

The present invention thus makes it possible to synchronize the on-period and off-periods of the LEDs very precise is relation to the alternatively arrangement of the different beam shaping patterns in the light beam.

In one embodiment the actuator 137 is provided as a step motor and the controller 119 is configured to count the steps moved by the step motor as known in the art of step motor controlling. In such embodiment the synchronizer 141 can be integrated as a function of the controller and configured to generate the synchronization signal based on the step motor count.

In another embodiment the synchronizer 141 comprises a detector configured to detect the rotation speed of the beam shaping object 107 and provide a synchronization signal indicative 143 of the rotation speed. The detector can for instance be based on magnetic detectors or optical detectors which are configured to be triggered every time the beam shaping object have rotated a given angular distance. For instance in one embodiment a magnet is provided on the beam shaping object and a magnetic sensor is activated every time the magnet passes the magnetic sensor can thus provide the synchronization signal indicative of when the magnet pass the magnetic sensor. The detector can then be configured to determine the rotation speed based on the signal from the magnetic sensor. The magnetic sensor can be any sensor capable of detecting a passing magnet such as a Hall Effect sensor, a magnetic switch, an anisotropic magneto resistive sensor, flux induction capacitors etc.

FIG. 2a-2c illustrates a top view (seen from a position along the beam shaping object's rotational axis 208) of a beam shaping object 207 embodied as a gobo wheel comprising two different beam shaping patterns embodied as gobo patterns positioned at different angular positions. The beam shaping object comprises a plurality of at least one of the beam shaping patterns, meaning the beam shaping object comprises a plurality of copies of the light beam pattern, which are arranged at different angular positions in relation to the rotation axis of the beam shaping object. It is to be understood that it is possible to provide a plurality of copies of one of the beam shaping patterns while providing only one beam shaping pattern with another pattern. Also it is possible to provide a plurality of each of the beam shaping patterns and that the number of the plurality each of the different beam shaping patterns may be different or the same. The plurality of beam shaping patterns can be arranged in alternating angular positions in relation to the axis of rotation 208.

In the illustrated embodiment a first beam shaping pattern 235a and a second beam shaping pattern 235b are arranged at alternating angular positions in relation to the rotating axis of the gobo wheel. As a consequence the every second beam shaping pattern patterns are the same. The position and extent of source light beam is indicated by dotted circle 213. This makes it possible to increase the light intensity of the projected images of the beam shaping pattern as the plurality of copies on the same beam shaping pattern makes it possible to illuminate the beam shaping pattern more often resulting in more light. Further the beam shaping object can be rotated at a slower speed and maintain a bright image of the beam shaping pattern. FIGS. 2a-b illustrate the beam shaping object 207, where in FIG. 2a a first beam shaping pattern 235a is located in the source light beam 213 and in FIG. 2b a second beam shaping pattern 235b is located in the source light beam 213. In FIGS. 2a-b each beam shaping pattern 235a-b has four copies distributed at regular angular intervals at the beam shaping object. As the beam shaping object rotates, the different copies will be located in the source light beam at a given time according to the rotational speed of the beam shaping object.

FIG. 2c illustrates that the beam shaping object comprises a non-shaping section 245, which is located between two consecutive beam shaping patterns, where the non-shaping section has an extent at least as big as the source light beam. The consequence of this is that both beam shaping patterns is fully out of the source light beam, and therefore it is possible to position the beam shaping patterns anywhere in the source light beam, by changing the starting time of the LED on-period, without making any of the consecutive beam shaping patterns visible due to the fact that the consecutive beam shaping pattern upon rotation of the beam shaping object will not enter the light beam before the first beam shaping pattern has exited the light beam.

A magnet 234 is illustrated at the beam shaping object and the light fixture comprises a magnetic sensor 240 arranged at a fixed position inside the light fixture which is configured to provide a synchronization signal every time the magnet pass the magnetic sensor.

FIGS. 3a-3i illustrate different light patterns 336, created by combining the different beam shaping patterns of the gobo wheel in FIG. 2a-b and by configuring the duration and/or start-time of the LED on-period in relation to the rotation of the beam shaping object. The start-time of the LED on-period defines when the LED on periods is activated and the duration of the LED on-period defines how long time the LED on-period is activated.

Figure 3A:
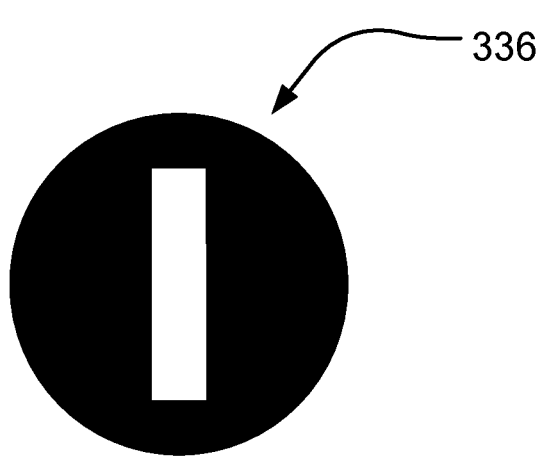
FIGS. 3a-3i illustrate different light patterns created by combining the different beam shaping patterns in FIG. 2a-2c.
Figure 3B:
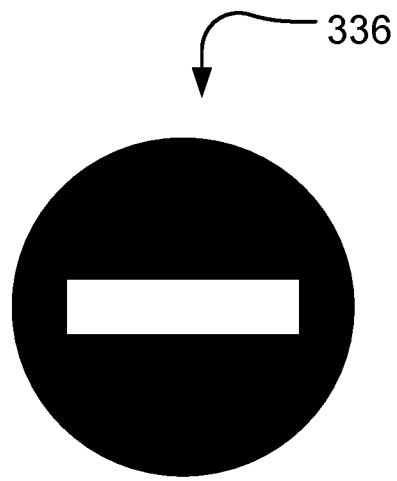

FIG. 3a-b illustrate light patterns, where the on-period are provided when only one of the beam shaping pattern is arranged in the light beam resulting in the fact that the light pattern of only one of the beam shaping patterns is created. This is achieved by stating the on-periods every time identical beam shaping patterns are arranged in the light beam. The duration of the LED on-period is set at low, so that the LED(s) makes a brief flash, and the start-time of the LED on-period is set so the LED on-period will start, when the beam shaping pattern is in the middle of the source light beam. The start-time will be calculated based on the rotation speed of the beam shaping object, the total number of beam shaping patterns and the synchronization signal. FIG. 3a illustrates the light pattern created when the first beam pattern 235a is arranged in the light beam and FIG. 3b illustrates the light beam pattern created when the second light beam pattern 235b is arranged in the light beam.

Figure 3C:
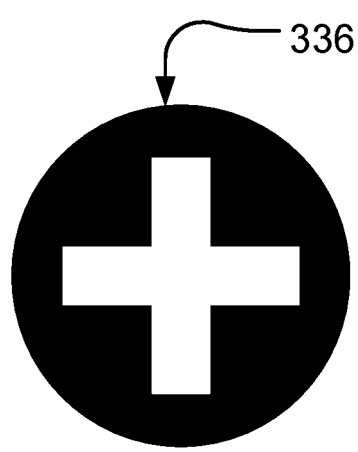

FIG. 3c illustrate a light pattern, where the beam shaping patterns are alternatively arranged in the source light beam and where on-periods are provided every time one of the two different light beam patterns are arranged in the light beam. This gives the illusion that the two different beam shaping pattern is combined into a new pattern. The LED on-period is set at low, so that the LED(s) make a brief flash, and the LED start-time is set so the LED on-period will start, when the beam shaping pattern is in the middle of the source light beam. The start-time will be calculated based on the rotation speed of the beam shaping object, the total number of beam shaping patterns and the synchronization signal.

Figure 3D:
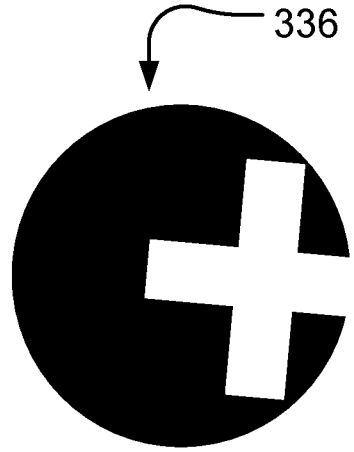

FIG. 3d illustrates the same light pattern as FIG. 3c, but here the start-time of the LED on-periods in relation to the position of the beam shaping patterns inside the source light beam are changed so that the beam shaping patterns will look like they are shifted to the right. This is achieved by adjusting the start-time in relation of the rotation speed beam shaping object. For instance by delaying the start-time of the on-periods causes the light pattern to move to one side while advancing the start-time causes the light patterns to move in the opposite direction. It is noticed that the optics of the system and the rotation direction of the beam shaping object defines in which direction the light patterns move upon delaying or advancing the on-periods in relation the rotation of the beam shaping object.

Figure 3E:
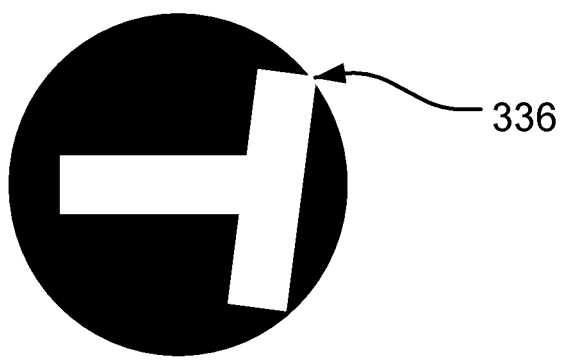

FIG. 3e illustrates a combination of the two beam shaping patterns 235a, 235b of FIG. 2a-b. The start-time of the LED on-period related to one of light beam patterns 235a has been delayed while the start-time of the other beam shaping pattern 235b is defined at the central position. The first beam shaping pattern 235a has been shifted to the right, so the start-time has been changed by introducing a delay. The second beam shaping pattern 235b is still located in the middle, thus the start-time is unchanged, if the middle position is considered as the starting point.

Figure 3F:
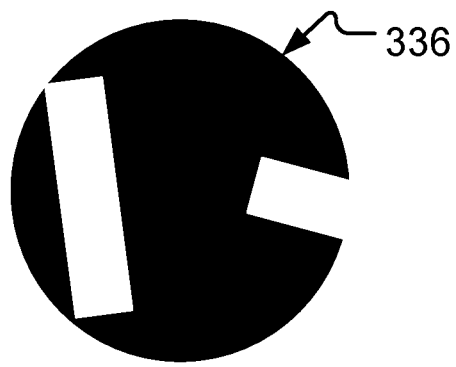

FIG. 3f illustrates a combination of the two beam shaping patterns 235a, 235b of FIG. 2a-b where the start-time of the LED on-period related to one of the light beam patterns has been delayed while the start-time of the other beam shaping pattern is advanced in relation to the central position. The first beam shaping pattern 235a has been shifted to the left so the start-time has advanced. The second beam shaping pattern 235b has been shifted to the right, so the start-time has changed by a delay.

Figure 3G:
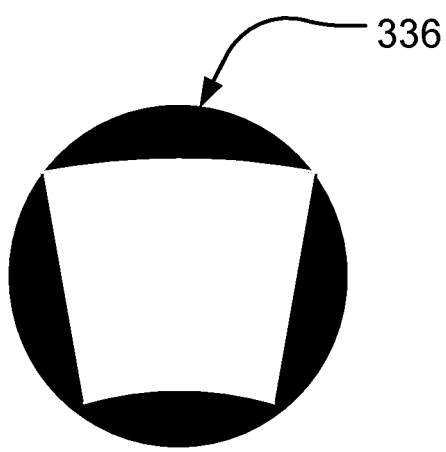

FIG. 3g illustrates a light pattern, where only the first beam shaping pattern 235a is visible at all times. This light pattern is created, by adjusting the start-time and the duration of the LED on-periods in relation to the rotation speed of the beam shaping object. Advancing the start-time of and extending the duration of the LED on-periods causes the light pattern to move to one side of the light pattern and stretches the extend of the pattern towards to the opposite side of the light pattern.

It is noticed that the optics of the system and the rotation direction of the beam shaping object defines in which direction the light patterns moved upon delaying or advancing the on-periods in relation the rotation of the beam shaping object.

Figure 3H:
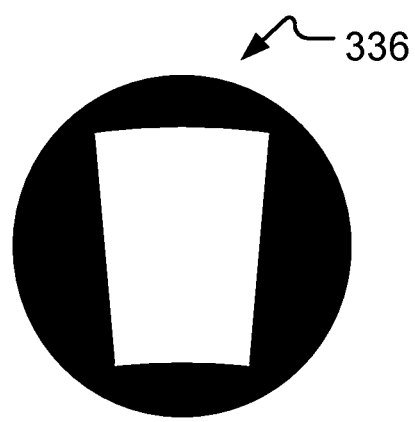

FIG. 3h illustrates the same light pattern, as in FIG. 3g however the start-time is less advanced than in FIG. 3g and the duration of the LED on-period is shorter than the case in FIG. 3g.

Figure 3I:
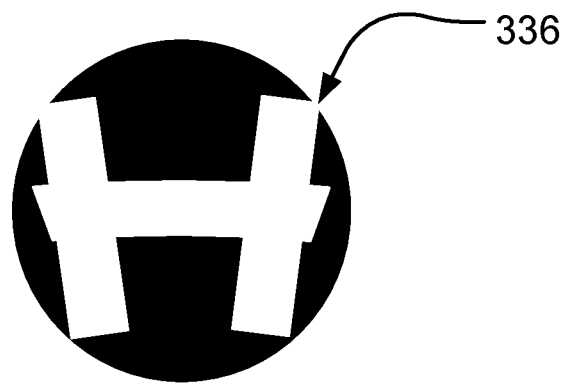

FIG. 3i illustrates a light pattern, where the second beam shaping pattern 235b is stretched, and the first beam shaping pattern 235a is appearing twice in different locations. This is achieved by adjusting the start-time and the duration of the LED on-periods. For instance by having two different start-times, on the same beam shaping pattern, where the second is larger than the first causes the illusion, that the beam shaping pattern appear at two different locations, at the same time. For the first beam shaping pattern 235a the effect is achieved by adjusting the start-time and the duration of LED on-time in relation to the rotation speed of the beam shaping object. By delaying the start-time and extending the duration of on-periods, causes the light pattern to move to one side and stretch to the opposite side.

FIG. 4a-4c illustrate a top view (seen from a position along the beam shaping object's rotational axis 408) of a different embodiment of a beam shaping object 407 embodied as a gobo wheel. In this embodiment the beam shaping object comprises a first 435a, second 435b and third 435c different beam shaping patterns embodied as gobo patterns. In addition the beam shaping object comprises an open section 447. The extent of the open section is larger than the source light beam (indicated by dotted circle 413) which allow the source light beam to pass through the open section unaffected.

FIG. 4a illustrates the situation where the light beam is arranged in the open section. The source light beam passes unaffected through the beam shaping object.

FIG. 4b-c illustrate the beam shaping object being located, in such a way that the source light beam is located in the middle between two consecutive beam shaping patterns, but places the source light beam in the non-shaping section 245 of the beam shaping object.

The increase in the number of beam shaping patterns on the beam shaping object, gives the benefit of an increased number light patterns. The open section 447 is useful when the beam shaping object is not rotating and thus not in use. The beam shaping object can then be rotated, so the open section is arranged in the source light beam 413. The light beam will then be unaffected by the beam shaping object. During continuously rotation of the beam shaping object, the controller can be configured to extend the LED off-period when the open section is arranged in the source light beam 413, such that no light is emitted when the open section is arranged in the light beam, hereby it is avoided that the open section 447 is used when creating light patterns.

The controller can also be adapted to provide LED on-periods when the open section is arranged in the light beam which makes it possible to provide an unaffected light beam when the beam shaping pattern is rotating continuously.

The beam shaping object comprises a number of first identifier configured to indicate the position a corresponding beam shaping pattern in relation to the source light beam 413. This makes it possible to generate a synchronization signal indicative of the position of the different beam shaping objects in relation to the light source beam upon rotation of the beam shaping object. In this embodiment the identifiers are provided as magnets and corresponding magnetic sensors, where the magnets 434a-d are arranged at different distances 432a-d from the edge of the beam shaping object such that magnets arranged near identical beam shaping patterns are arranged at the same distance from the edge of the beam shaping object. The light fixture comprises four magnetic sensors 440a-d arranged at fixed positions inside the light fixture and each magnetic sensor is configured to provide a synchronization signal every time one of the magnets passes the magnetic sensor. The four magnetic sensors are placed at four different locations depended on the distances 432a-d. This allows the controller to receive a unique synchronization signal every time a magnet is arranged near a certain kind of beam shaping pattern passes the corresponding magnetic sensor. This makes it possible to arrange the magnets and the corresponding magnetic sensor such that is it possible to provide synchronization signals that is indicative of which beam shaping pattern is about to enter the source light beam. For instance the magnets can be arranged in relation to the beam shaping patterns such that the corresponding magnets pass the magnetic sensor just before the beam shaping pattern enters the light beam.

In FIG. 4a a magnet 434a is about to pass the magnetic sensor 440a. When the magnet 434a passes the magnetic sensor 440a, the controller receives a synchronization signal indicating that a first beam shaping pattern 435a is about to enter the source light beam 413. In FIG. 4b a magnet 434d is placed directly below the magnetic sensor 440d indicating that the open section 413 is about to enter the source light beam 413. In FIG. 4c magnet 434d has passed the magnetic sensor 440d and a new magnet 434a is passing the magnetic sensor 440*a* indicating that the beam shaping pattern 435*a* is about to enter the source light beam. One implementation on the controller could be to turn these synchronization signals into interrupts on the controller which then can be subscribed to, depended on which beam shaping pattern is wanted. This saves a lot of calculations on the controller and makes it more robust to changes in the rotational speed in the beam shaping object. One should notice that using magnets is just an example of a way to implement the synchronization signal. One could also use optical sensors where the magnets would be replaced by holes and a light source would then activate a light sensor every time a hole passes over the light sensor. Alternatively the synchronization signals can also be provided by a photo sensor configured to detect dark, bright or colored spots on the beam shaping abject and the magnets can in such embodiment be provided as dark, bright or colored spots. One should also notice that the number of magnets and their position is also just an example. The same results could be achieved by using more or less magnets placed differently on the beam shaping object.

FIGS. 5*a-h* illustrate different light patterns 536 created by combining the different beam shaping patterns 435*a-c* of the gobo wheel in FIG. 4*a-c* and by configuring the duration and/or start-time of the LED on-period in relation to the rotation of the beam shaping object.

Figure 5A:
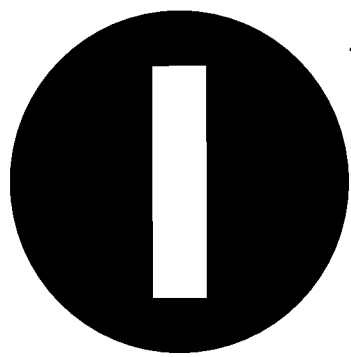
FIGS. 5a-5h illustrate different light patterns created by combining the different beam shaping patterns in FIG. 4a-4c.
Figure 5B:
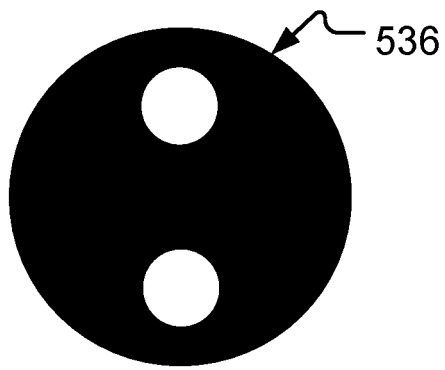

FIG. 5*a-b* illustrates a light pattern, where the on-period are provided when only one of the beam shaping pattern is arranged in the light beam resulting in the fact that the light pattern of only one of the beam shaping patterns are created. The LED on-period is set at low, so that the LED(s) make(s) a brief flash, and the start-time of the LED on-period is set so the LED on-period will start, when the beam shaping pattern is in the middle of the source light beam. The start-time will be calculated based on the rotation speed of the beam shaping object, the total number of beam shaping patterns and the synchronization signal. FIG. 5*a* illustrates the light pattern created when the first beam shaping pattern 435*a* is arranged in the light beam and FIG. 5*b* illustrates the light beam pattern created when the third beam shaping pattern 435*c* is arranged in the light beam.

Figure 5C:
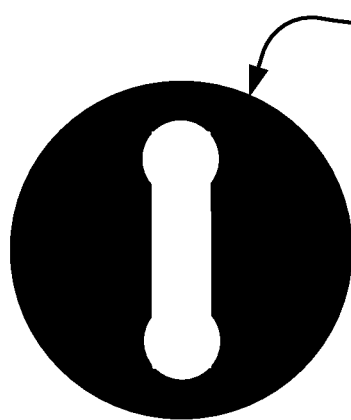
Figure 5D:
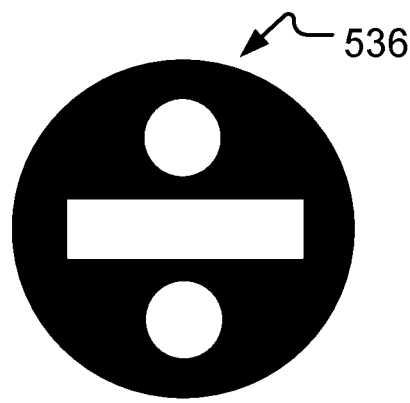

FIG. 5*c-d* illustrates a light pattern, where two of the beam shaping patterns is alternatively arranged in the source light beam and where the LED on-periods are provided every time one of the two different light beam patterns are arranged in the light beam. This gives the illusion that the two different beam shaping pattern is combined into a new pattern. The LED on-period is set at low, so it will only make a brief flash, and the LED start-time is set so the LED on-period will start, when the beam shaping pattern is in the middle of the source light beam. The start-time will be calculated based on the rotation speed of the beam shaping object, the total number of beam shaping patterns and the synchronization signal. In FIG. 5*c* the first 435*a* and third 435*b* beam shaping patterns are combined and in FIG. 5*d* the second 435*b* and third 435*c* beam shaping patterns are combined.

Figure 5E:
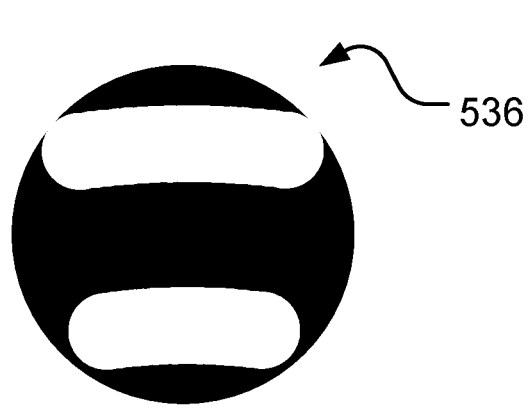

FIG. 5*e* illustrates a light pattern, where only the third beam shaping pattern 435*c* is visible at all times, and stretched from one side to other. This is achieved by adjusting the start-time and duration of the LED on-period in relation to the rotation speed of the beam shaping object. By advancing the start-time and extending the duration of the on-periods, causes the light pattern to move to one side and extending the duration of the LED on-period stretches the pattern towards the opposite side.

It is noticed that the optics of the system and the rotation direction of the beam shaping object defines in which direction the light patterns moved upon delaying or advancing the on-periods in relation the rotation of the beam shaping object.

Figure 5F:
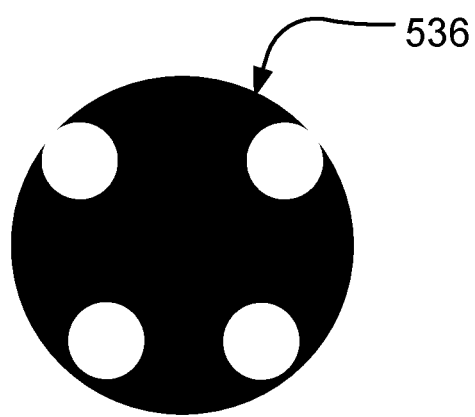

FIG. 5*f* illustrates a light pattern, where the third beam shaping pattern 435*c* appearing twice at different positons within the light beam locations. This is achieved by adjusting the start-time of the LED on-periods such that two flashes are created every time the third beam shaping pattern pass through the light beam.

Figure 5G:
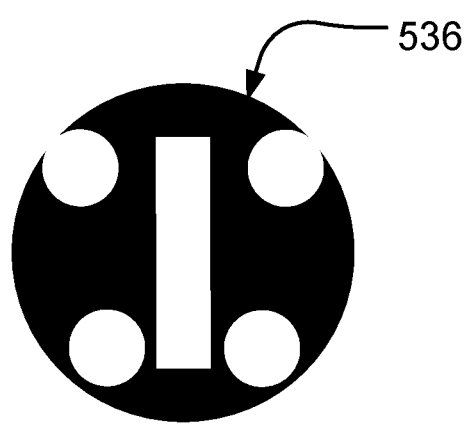

FIG. 5*g* illustrates a light pattern where the light pattern of FIG. 5*f* have been combined with the light pattern created by flashing when the first beam shaping pattern 435*a* are in the center of the light beam.

Figure 5H:
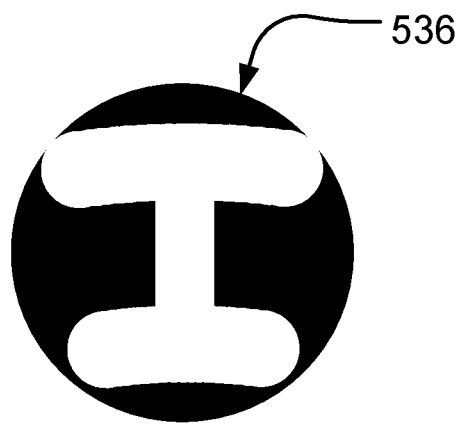

FIG. 5*h* illustrates a light pattern, where the third beam shaping pattern 435*c* is stretched, and the first beam shaping pattern 435*a* appearing in the center of the source light beam. This is achieved by adjusting the start-time of the LED on-period, so the LED will turn on, when the first beam shaping pattern 453*a* is located in the middle of the source light beam. The effect created with the third beam shaping pattern 435*c* is achieved by advancing the start-time and extending the duration of the LED on-periods, which causes the light pattern to move to one side and stretch to the opposite side.

Figure 6A:
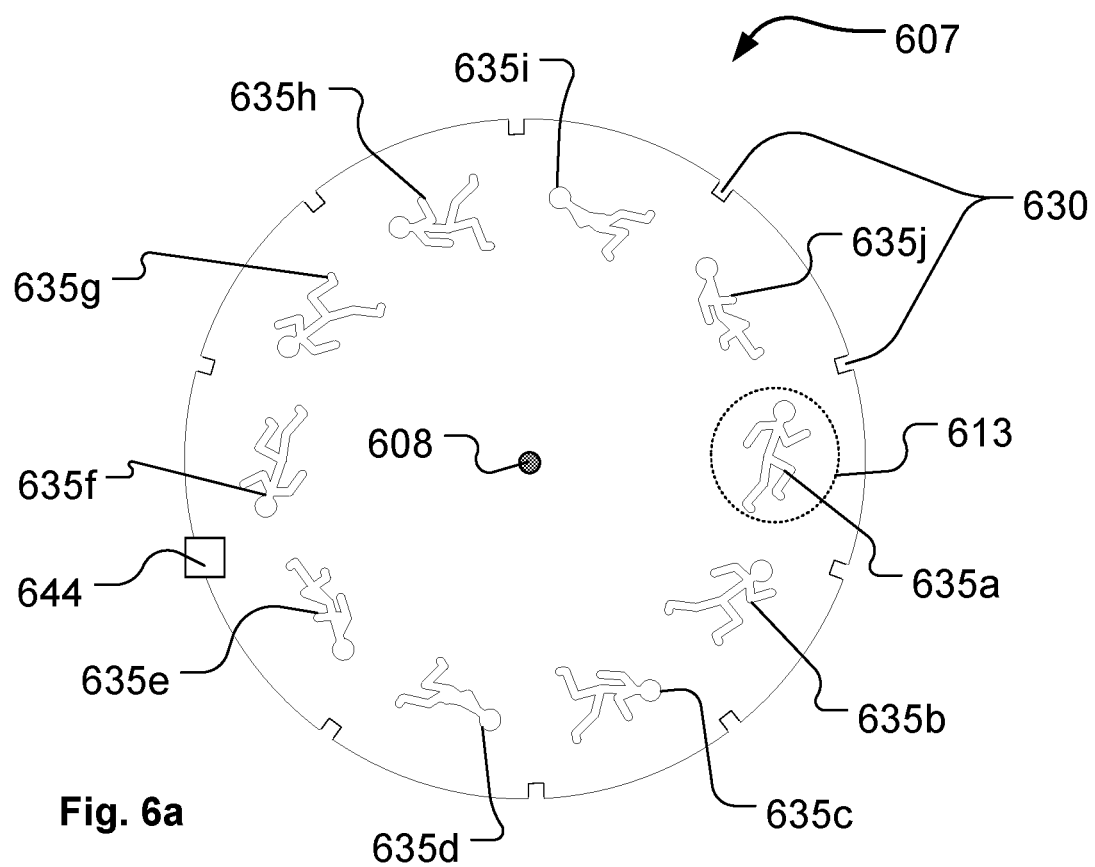
FIG. 6a-6b illustrates a different embodiment of a beam shaping object with notches and optical detection of said notches.

FIG. 6*a* illustrates another embodiment of a beam shaping object embodied as a gobo wheel comprising ten different beam shaping patterns 635*a*-635*i*. The ten beam shaping patterns will when the beam shaping object is rotated, generate an animation of a man running. The beam shaping object contains notches 630 and together with an optical sensor 644, these notches can be used to generate the synchronization signal. To make the beam shaping patterns appear as an animation, instead of just ten combined or individual patterns, the speed of which the beam shaping object rotates needs to be configured, so the human eye will detect the change in pattern. A typical movie has a frame rate of roughly 25 frames/second, and since there are ten beam shaping patterns on the beam shaping object, the beam shaping object should rotate with a speed of roughly 2.5 revolutions per seconds (RPS), to achieve the same frame rate as a movie. It is to be understood that other frame rates can be provided as long as the human eye is capable of seen the generated light patterns as two districts images. The same effect can also be achieved by the beam shaping objects in FIG. 2 and FIG. 4. This will cause a toggling effect, where a visible transformation between the first beam shaping pattern to the second beam shaping pattern. It is also noted that beam shaping objects with different kind of animation patterns can be provided. For instance the beam shaping object can be rotated at a speed alternately arranging the beam shaping patterns in the source light beam at a speed enabling a human will to pensive the as different images created by the beam shaping objects. It may sufficient to rotate the beam shaping object a speed arranging the different beam shaping objects at a rate slower than 100 frames per second, where a frame corresponds to the image created be the gobo patterns, as some people would be capable of observing the different mages at framing rates up til 100 frames per second. However a frame rate between 20-35 frames per second provides a good animation effect.

Figure 6B:
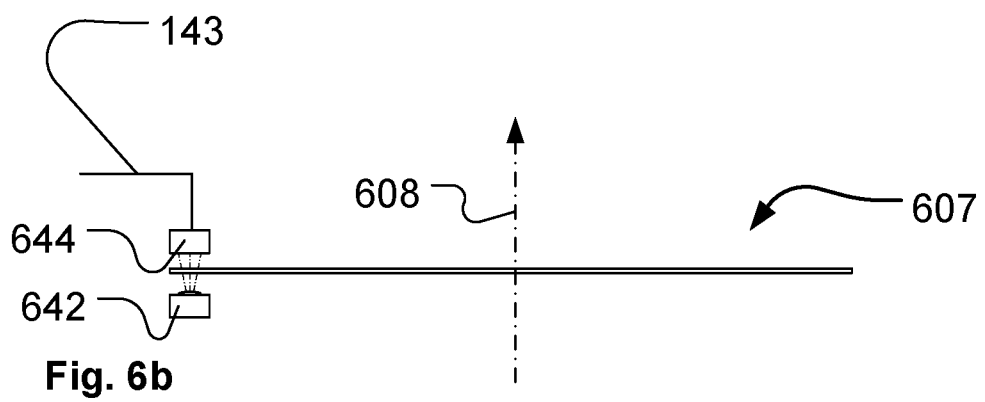

FIG. 6*b* illustrates a side view of the beam shaping object 607 to show the optical sensor which can be implemented as an optical sender 642 and an optical receiver 644. One should notice that the optical sensor is just one way to implement the synchronization signal 143.

Figure 7:
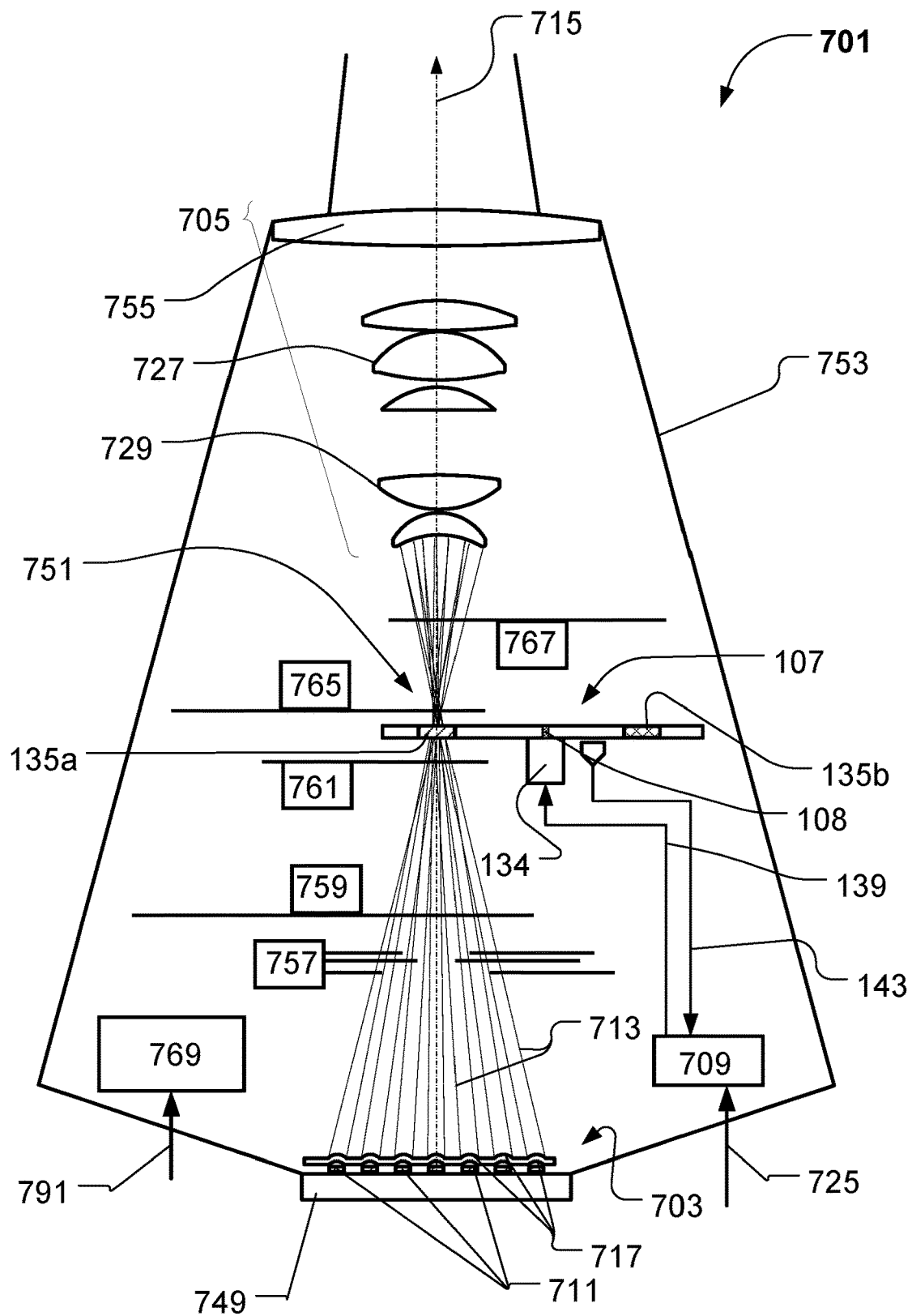
FIG. 7 illustrates a structural diagram of another embodiment of a projecting light fixture according to the present invention.

FIG. 7 illustrates a structural diagram of a projecting light fixture 701 according to the present invention. The projecting light fixture comprises the same basic components as the projecting light fixtures illustrated in FIG. 1 and identical elements have been given the same components as in FIG. 1 and will not be described in detail.

The light fixture comprises a plurality of light sources 711 formed as LEDs arranged on a heat sink 749, a plurality of light collectors 717, an optical gate 751 and an projecting system 705. The light sources and heat sink are arranged at one end of a lamp housing 753 of the light fixture and the other components are arranged inside the lamp housing 753. The light collectors 717 are configured to collect light from the LEDs 711 and to convert the collected light into a plurality of source light beams 713 (dotted lines) propagating along the primary optical axis 715. In the illustrated embodiment the light collector comprises a number of lenslets each collecting light from one of the LEDs and converting the light into a corresponding source light beam. However it is noticed that the light collector also can be embodied as a single optical lens, a Fresnel lens, a number of TIR lenses (total reflection lenses), a number of light rods etc. or combinations thereof. It is understood that light beams propagating along the optical axis contain rays of light propagating at an angle, e.g. an angle less than 45 degrees to the optical axis.

As described previously the projecting system 705 is configured to collect at least a part of the light beams transmitted through the optical gate and to project the light along the primary optical axis and may be configured to image the optical gate 751 onto some object such as a screen, e.g. a screen or an area on a concert stage. A certain image, e.g. some opaque pattern provided on a transparent window, an open pattern in a non-transparent material, or imaging object such as gobos known in the field of entertainment lighting, may be arranged near the optical gate 751 so that that the illuminated image can be imaged by the optical projecting system. The light fixture 701 comprise a beam shaping object 107 as described in FIG. 1 and the projecting system can be configured to image the beam shaping object a distance along the optical axis 115.

In the illustrated embodiment the light is directed along the optical axis 715 by the light collector 717 and passes through a number of light effect components before exiting the light fixture through a front lens 755. The light effects components creates various light effects and can for instance be any light effects components known in the art of intelligent/entertainments lighting. The light effects components can for instance be, a CMY color mixing system 757, color filters 759, gobos 761, beam shaping object 707 according to the present invention, a iris diaphragm 765, prism effect 767, an optical focus group 729, an optical zoom group 727, framing effects (not shown), or any other light effect components known in the art of entertainment lighting. The mentioned light effect components only serves to illustrate the principles of an illuminating device for entertainment lighting and the person skilled in the art of entertainment lighting will be able to construct other variations with additional are less light effect components. Further it is noticed that the order and positions of the light effect components can be changed.

The projecting light fixture 701 comprises at least one controller 709 configured to control a plurality of LEDs 711 by toggling between the LED on-periods and LED off-periods and controlling the beam shaping object 107 based on the synchronization means as described previously.

Additionally the controller 709 is configured to control (communication lines not shown) the light effect components in the light fixture as known in the art of intelligent lighting e.g. by controlling how the CMY flags of the CMY color mixing system 757 is inserted into the light beam, controlling which color filters 759 to be arranged in the light beam, control gobos 761 and movement of the gobos in the light beam, controlling speed and direction of rotation of the beam shaping object 707, control size of iris diaphragm 765, control the position of framing blades with in the light beam etc. The controller 709 can control the light effect components based on at least one light effect parameter received from an input signal 725, from a user interface or from a program stored in a memory. Typically the light effect parameter is indicative of at least one light effect parameter related to the different light effects in the light system. The controller 709 is configured to send commands and instructions to the different subsystems of the projecting light fixture through internal communication lines (not shown). The internal communication system can be based on a various type of communications networks/systems. It is also noticed the controller 709 can be embodied as more than one controller. The projecting light fixture receives electrical power 791 from an external power supply (not shown). The electrical power is received by an internal power supply 769 which adapts and distributes electrical power through internal power lines (not shown) to the subsystems of the moving head. The internal power system can be constructed in many different ways for instance by connecting all subsystems to the same power line. The skilled person will however realize that some of the subsystems in the projecting light fixture require different measures of power and that a ground line also can be used. The light source will for instance in most applications need a different measure of power than step motors for moving mechanical components and driver circuits. The projecting light fixture can also comprise a user interface (not shown) enabling a user to interact directly with the projecting light fixture alternatively or in addition to using a light controller to communicate with the light fixture. The user interface can for instance comprise bottoms, joysticks, touch pads, keyboard, mouse, displays, touch screen etc.

It is noticed that the projecting light fixture 701 also can be integrated as the head of a moving head light fixture comprising a head rotatable connected to a yoke, where the yoke is rotatable connected to a base. The moving head light fixture comprises pan rotating components for rotating the yoke in relation to the base and tilt rotating components for rotating the head in relation to the yoke. The skilled person will realize that the pan and tilt rotation means can be constructed in many different ways using mechanical components such as motors, shafts, gears, cables, chains, transmission systems, bearings etc. In moving head light fixtures it is possible to arrange the controller 709 and/or the internal power supply 769 in the yoke or in the base.

FIGS. 8a-8d illustrate structural diagrams of different embodiments of a light projecting fixture 801a-801d according to the present invention. The projecting light fixtures 801a-801d respectively illustrated in FIGS. 8a-8d are similar to the projecting light fixtures illustrated in FIG. 1 and FIG. 7 and similar features as been labeled with the same reference numbers as in FIGS. 1 and 7 and will not be described in further details. It is to be understood that for simplicity the controller controlling the beam shaping object 107 and light sources 811 has not been shown.

FIGS. 8a-8d illustrate different embodiments of the light source module 803a-803d of the projecting light fixtures.

Projecting light fixtures 801a-801d comprise a light source module 803a-803d, a projecting system 805 and an optical gate 751 arranged between the light source module 803a-803d and the projecting system 805. At least one beam shaping object 107 as described previously is arranged near the optical gate. Additional beam shaping objects (not shown) such as gobos, animation wheels, frost filters, framing blades, an iris, color filters, prisms, textured gobos etc. can also be provided near the optical gate. The beam shaping objects is configured to modify the light passing the optical gate. It is to be understood that a controller (not illustrated in FIG. 8a-8d) is configured to control the different components of the illumination device 801a-801d and that the controller is configured to control the light source module 803a-803d and the beam shaping object 107 as described previously.

Figure 8A:
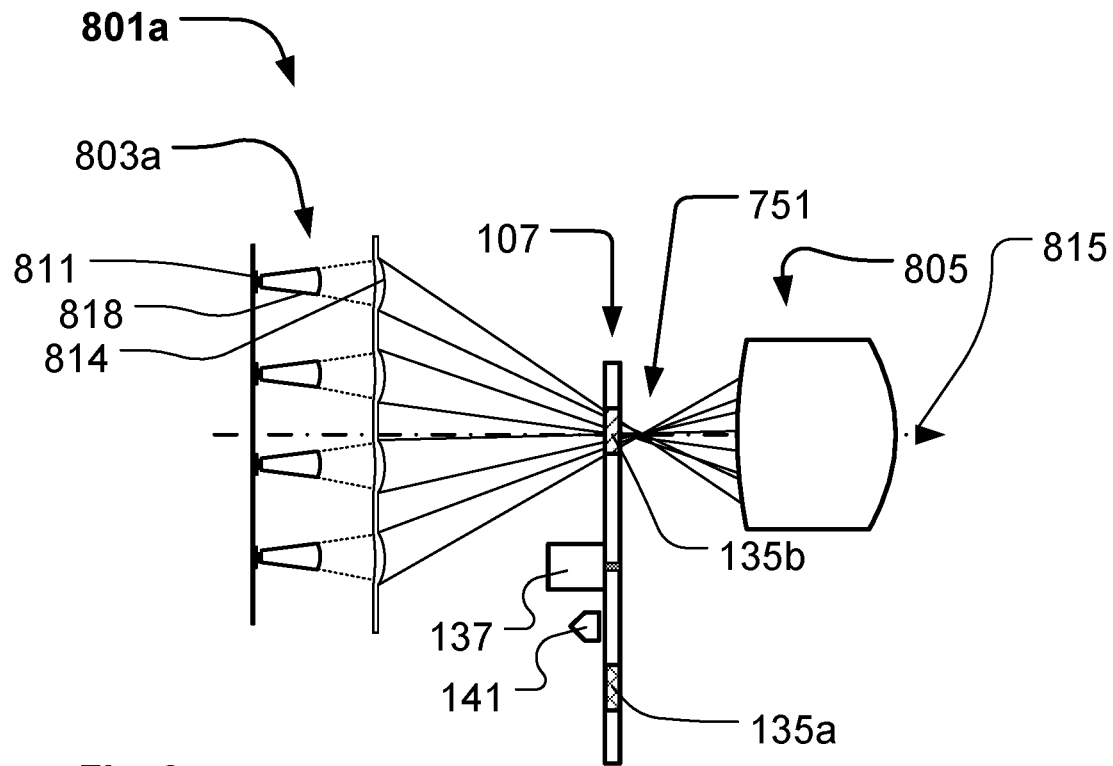
FIGS. 8a-8d illustrate different embodiments of a light source module of an illumination device according to the present invention.

FIG. 8a illustrates an embodiment where the light collectors have been embodied as a plurality of light mixing rods 818, where light from the light sources 811 enters the light mixing rod in one end and is transmitted to the other end where the light exits the light mixing rod. A lens 814 is configured to collect the light from the light mixing rod and direct the collected light towards the optical gate 751 and the beam shaping object 107. In an embodiment where the light sources have been embodied as multiple die LEDs (e.g RBG, RGBW etc.) the light mixing rod serves to mix the light from the different dies of the LEDs and the outgoing light is thus mixed into a uniform light beam as known in the art of light mixing rods. In the illustrated embodiment there is one lens pr. light mixing rod, however it is to be understood that a lens in some embodiments can receive light from a plurality of light mixing rods.

Figure 8B:
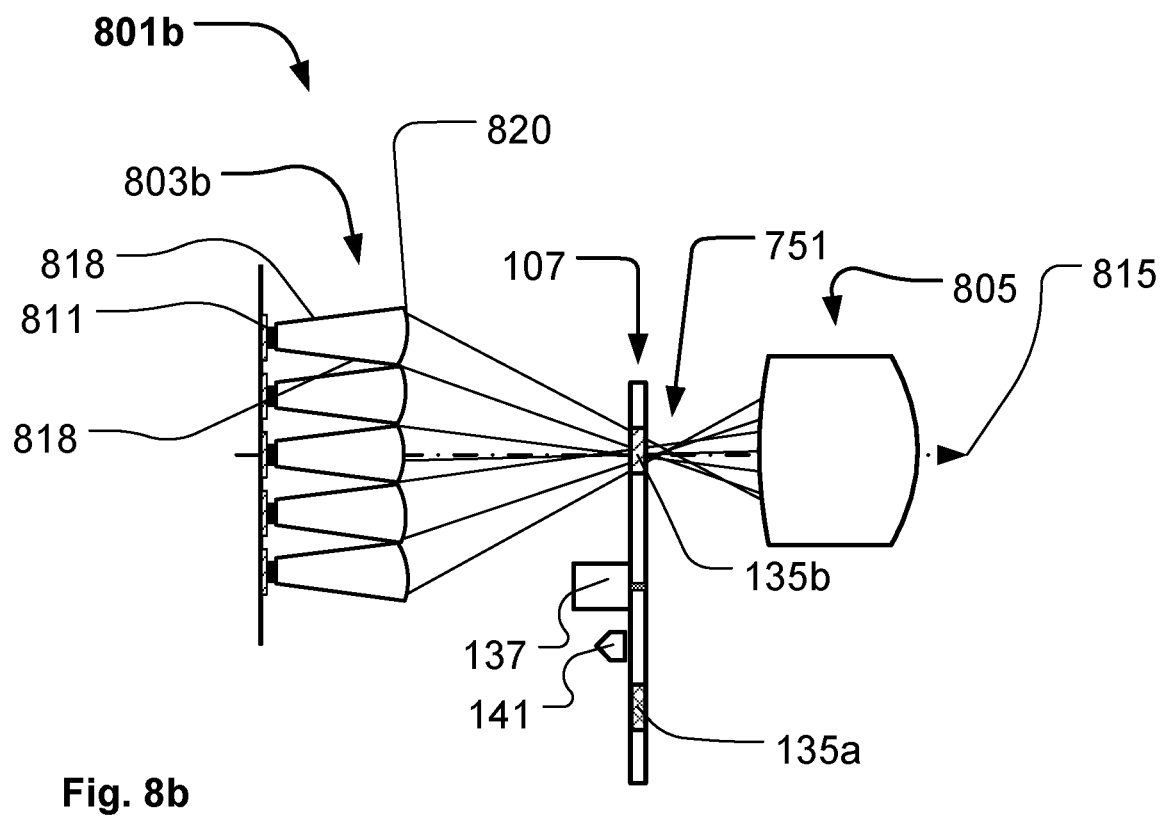

FIG. 8b illustrates an embodiment where light collectors have been embodied as a plurality of light mixing rods 818, where light from the light sources 811 enters the light mixing rod in one end and is transmitted to the other end where the light exits the light mixing rod. In this embodiment the exit surface 820 of the light mixing rod have been configured to direct the exiting light towards the optical gate 751 and beam shaping object 107, for instance by configuring the refractive properties of the exit surface.

Figure 8C:
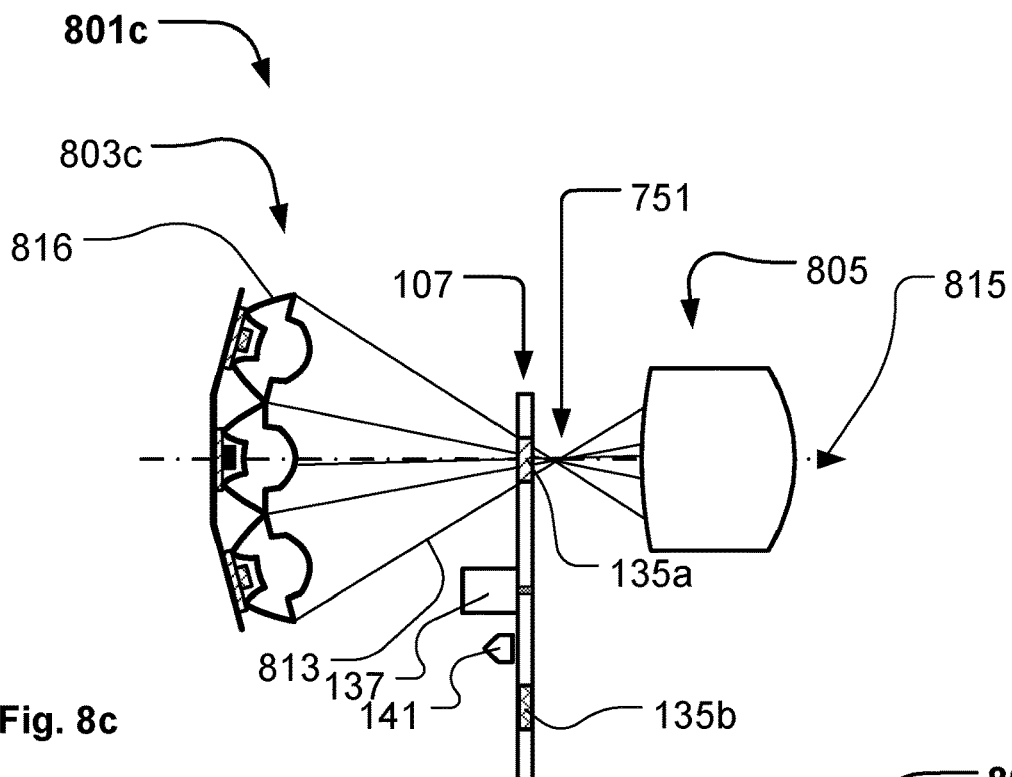

FIG. 8c illustrates an embodiment where the light collectors have been embodied as TIR (total internal refection) lenses 816. The TIR lenses are configured to collect light from the light sources 811 and direct the collected light towards the optical gate 751 and beam shaping object 107. The TIR lenses comprise a peripheral part collecting a peripheral part of the light generated by the light sources and direct the peripheral part of the light toward the optical gate. In the peripheral part the collected light is reflects forwardly using total internal reflection at the outer wall of the peripheral part. The TIR lens comprises a central part configured to collect a central part of the light generated by the light source and to direct the central part of the light towards the optical gate and beam shaping object. In the illustrated embodiment the light sources and TIR lenses have been angled in relation to each other in order to focus the source light beams 813 at the optical gate where the beam shaping object is arranged. However it is to be understood that the light sources and TIR lenses do not need to be tilted in relation to each other as the exit surface for the peripheral part and the central part can be configured to deflect the focus the source light beams at the optical gate, also a lens like the one shown in FIG. 8a can be used to direct the light towards the optical gate.

Figure 8D:
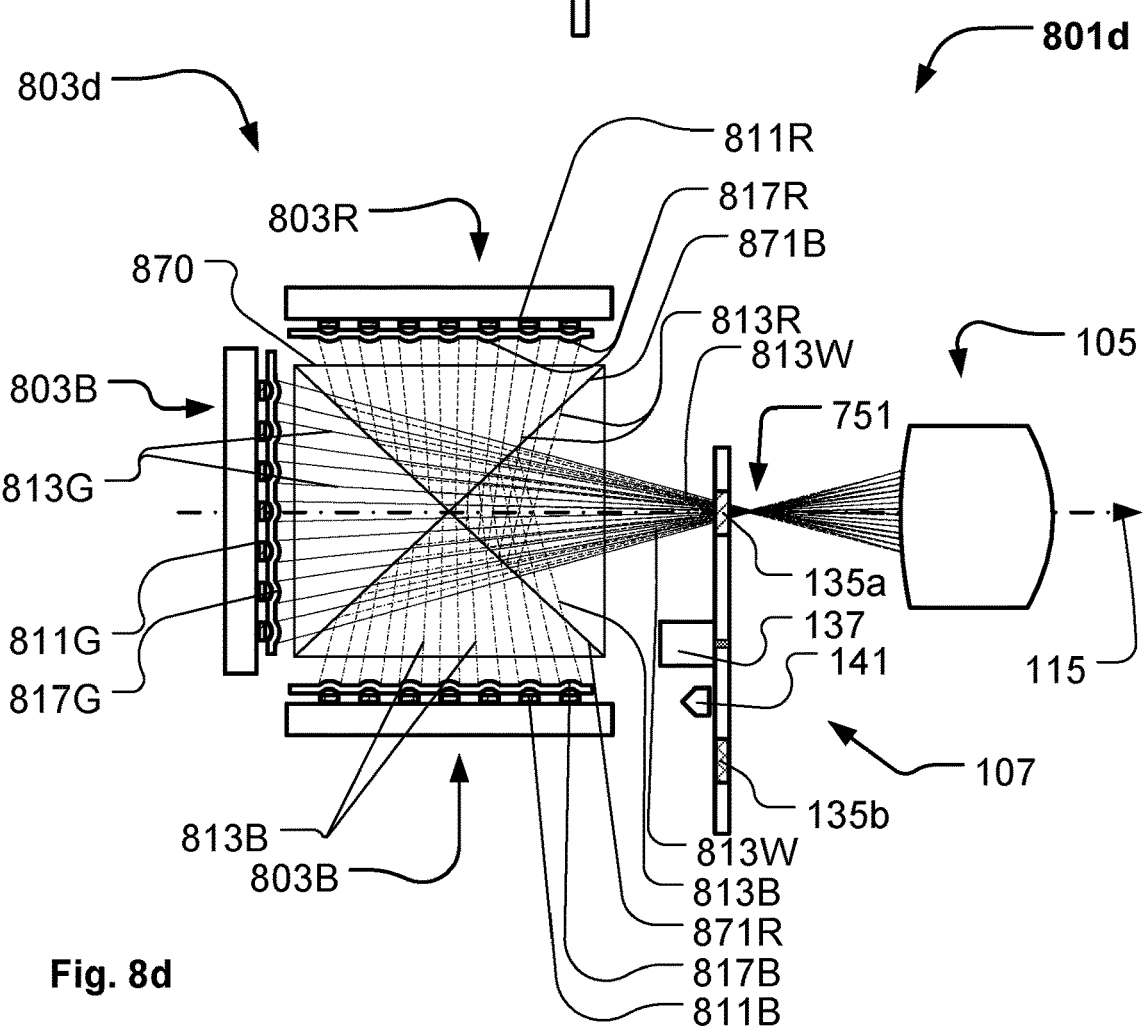

FIG. 8d illustrates an embodiment where the light source module 803d comprises a red light source module 803R, a green light source module 803B and a blue light source module 803B and a color cube 870. The red light source module 803R comprises a plurality of red light sources 811R, the green light source module 803G comprises a plurality of green light sources 811G and the blue light source module 803B comprises a plurality of blue light sources 811B. The light from the red, green and blue light sources are combined into a common light beam using dichroic filters of the color cube. The color cube 870 comprises a "red" dichroic filter 871R adapted to reflect red light and transmit other colors and a "blue" dichroic reflector 871B adapted to reflect blue light and transmit other colors. The red and blue light will thus be reflected by the red dichroic filter and the blue dichroic filter respectively whereas the green light will pass directly through the color cube. The consequence is an output light beam 813W which appears white in accordance with the rules of additive color mixing.

The red light source module comprises a plurality of red light collectors 817R configured to collect light from the red light sources 811R and to convert the collected light into red source light beams 813R (illustrated as dashed lines). The green light source module comprises a plurality of green light collectors 817G configured to collect light from the green light sources 811G and to convert the collected light into green source light beams 813G (illustrated as dotted lines). The blue light source module comprises a plurality of blue light collectors 817B configured to collect light from the blue light sources 811B and to convert the collected light into blue source light beams 813B (illustrated as dash-dotted lines). This embodiment makes it possible to provide similar light effects as described previously, with the addition that the light effects can be provided using each of the three primary colors in a color cube system and the intensity of each of the primary colors are high.

Figure 9:
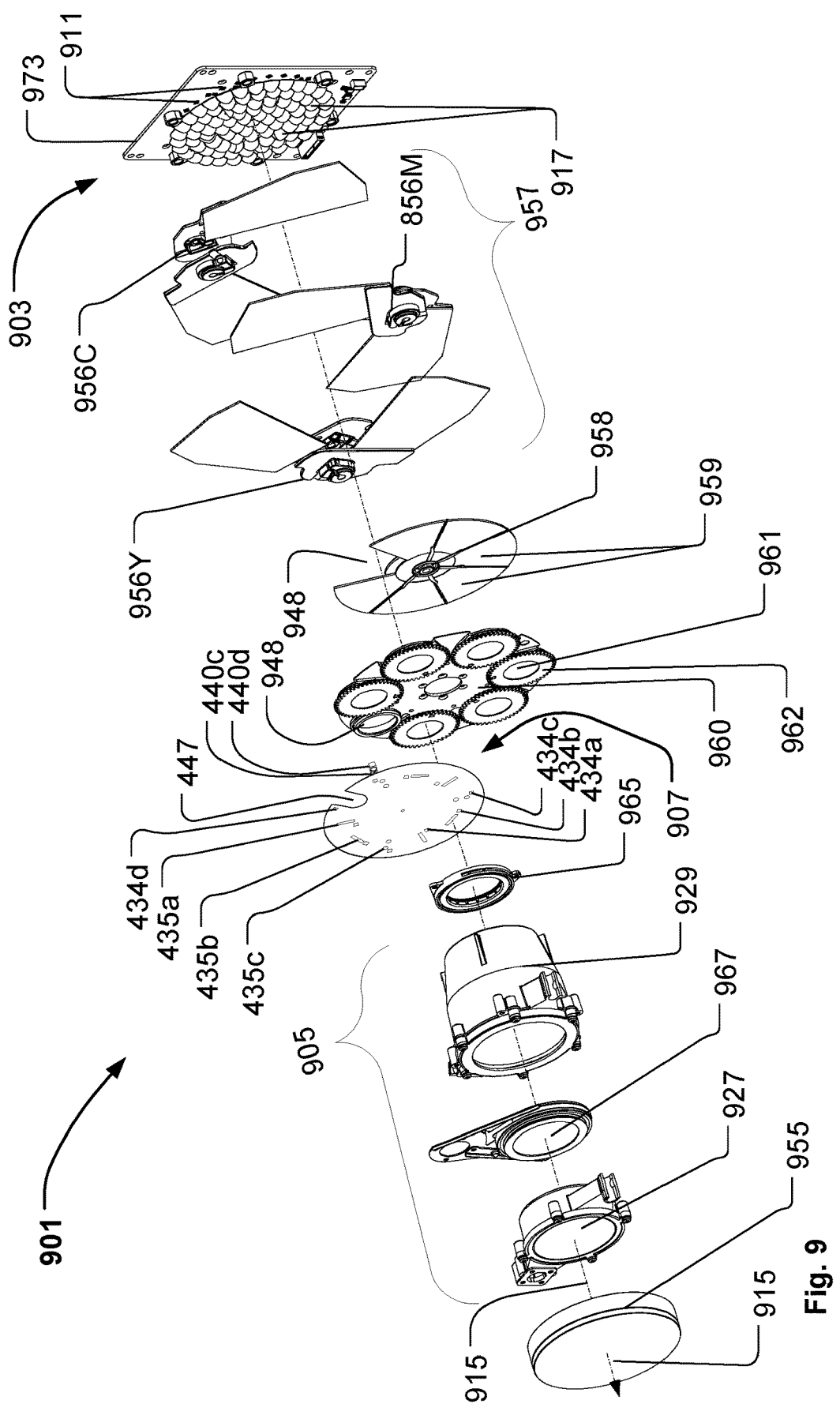
FIG. 9 illustrate another embodiment the projecting light fixture according to the present invention.

FIG. 9 illustrates an exploded view of an embodiment of a projecting light fixture 901 according to the present invention. FIG. 9 only illustrates the main components of the projecting light fixture and several components have been omitted for the sake of simplicity. For instance structural components such as carrying plates, electrical components and actuators have been omitted.

The projecting light fixture 901 comprises the same basic components as the projecting light fixtures illustrated in FIGS. 1 and 7 and similar elements providing similar effects have in FIG. 9 been given the same last two digits as in FIGS. 1, and 7 and the components are arranged in a housing (not shown)

The projecting light fixture comprises a light source module 903 comprising a plurality of LEDs 911 arranged on a LED PCB 973 and a light collector comprising a plurality of lenslets 917. Each of the lenslets is configured to collect light from a corresponding LED 911 and convert the collected light into a corresponding source light beam (not shown) propagating along the primary optical axis 915. A projecting system 905 is configured to collect at least a part of the light beams and to project the collected light along the primary optical axis 915.

In the illustrated embodiment the light is directed along the optical axis 915 by the light collector 917 and passes through a number of light effect components before exiting the light fixture through a front lens 955. In this embodiment the projecting light fixture 901 comprises a CMY color mixing system 957, a color wheel 958, a rotating gobo wheel 960, a beam shaping object 907, an iris diaphragm 965, an optical focus group 929, a prism 967 and an optical zoom group 927.

The color wheel 958 comprises a plurality of color filters 959 of different colors the color wheel can be rotated around a center axis by an actuator (not shown) and the color filters can hereby be inserted into the source light beams. The color wheel comprises also an open section 948 which can be inserted into the source light beams and whereby no color effect is applied to the source light beams by the color wheel. The color wheel and color filters can be embodied in any way as known in the art of entertainment lighting.

The rotating gobo wheel 960 comprises a plurality of gobos 961, where each of the gobos are arrange in a gobo holder 962 enabling rotation of the gobo around it's center axis. Each of the gobos are arrange in a bearing comprising a toothed wheel which engages a center toothed wheel (not shown) and rotation of the center toothed wheel results in rotation of the rotating gobo holders. The gobo wheel can also be rotated in order to arrange different gobos in the source light beams and comprises also an open section 948 with no gobo. In this embodiment the optical gate are defined by the gobos and open section of the rotating gobo wheel. The rotating gobo wheel, gobo holders and gobos filters can be embodied in any way as known in the art of entertainment lighting.

The projecting light fixture comprises a beam shaping object 407 as described in FIG. 4. The beam shaping object comprises a plurality of beam shaping patterns 435*a-c*, an open section 447, magnets 434*a-d*, an actuator (not shown), and magnetic sensors 440*a-b*. The beam shaping object can be rotated in order to alternatively arrange the specific beam shaping patterns in the source light beam to generate light patterns, which can be combination of two or more beam shaping patterns as described previously. The magnets and the magnetic sensors are used to time the toggling of the LEDs 911 to create the desired light effect as described previously.

An iris diaphragm 965 has been arranged after the beam shaping object and can be used to delimit the source light beams. The iris diaphragm can be embodied in any way as known in the art of entertainment lighting.

The optical focus group 929 can be moved along the primary optical axis by an actuator (not shown) and optical focus group can thus be used to provide a sharp image of the gobos at a target surface along the primary optical axis. However it is also possible to arrange the optical focus group in non-focusing positions if desired. The optical zoom group 927 can be moved along the primary optical axis in order to change the size and/or divergence of the light beams. A faceted prism is arranged on a prism arm 964, which can move the prism in and our out of the source light beams. Additionally the prism arm comprises a mechanism which can rotate the prism around its own central axis when arranged in the source light beams. The facets of the prism deflects the source light beam and creates a number of "copies" of the source light beams as known in the art of entertainment lighting. The number of facets determines the number of copies. E.g. a 3 faceted prism will create three copies of the source light beams and in an image projecting system three identical images will be created offset each other. The optical focus group, the optical zoom group the prism in any way as known in the art of entertainment lighting. The controller can be configured to coordinate the rotation of the prism in relation the variations of the different illuminations of the beam shaping object. This makes it possible to rotate the "copies" of the light patterns in relation to the primary optical axis and at the same time change the light patterns using by varying the intensity of the different illuminations.

Figure 10:
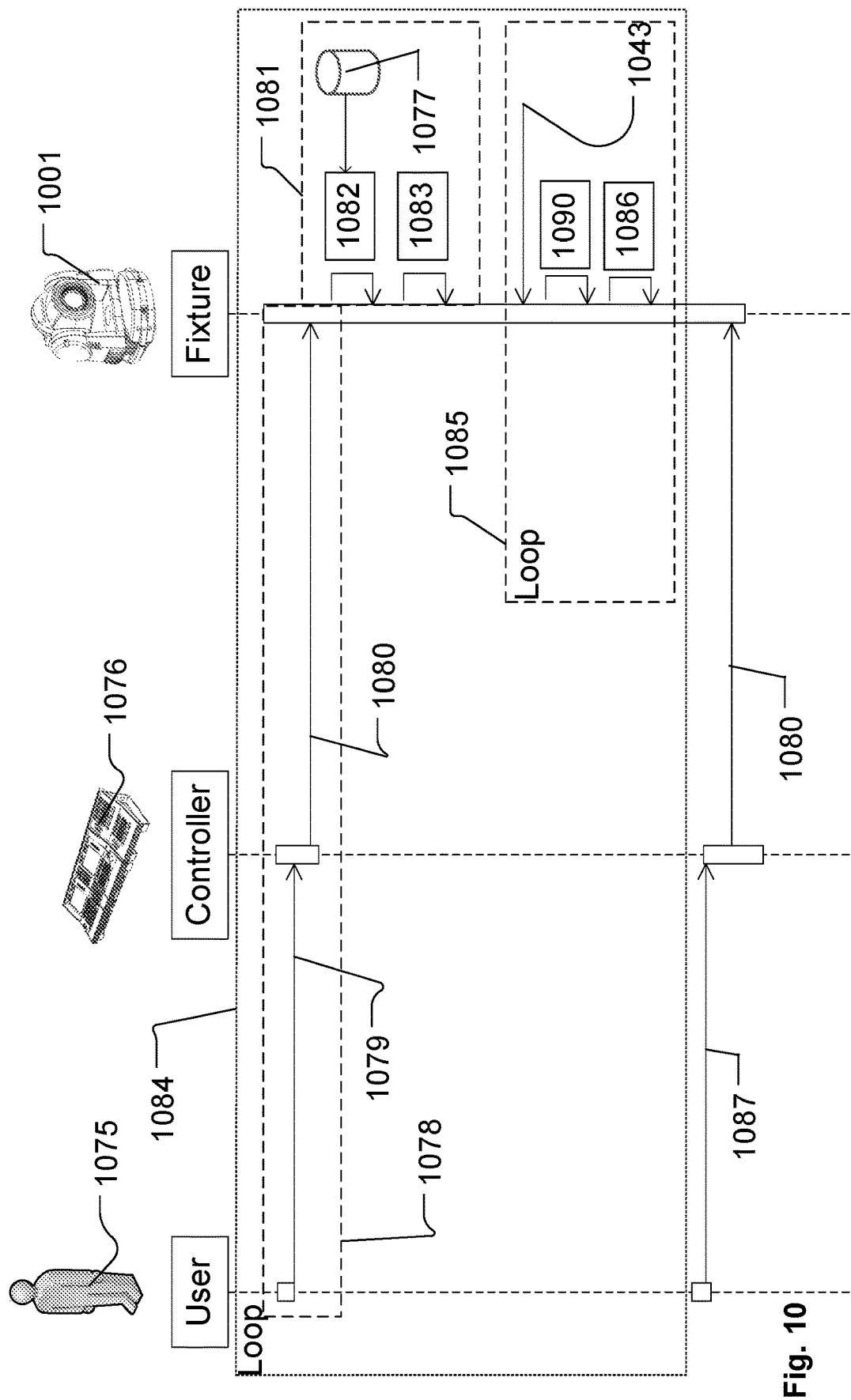
FIGS. 10-12 illustrate flow diagrams of different methods for controlling the effects for the beam shaping pattern according to the present invention.

FIG. 10 illustrates a simplified sequence diagram of a method of creating light effects according to the present invention. The method comprises the step 1078 of choosing the desired light effect, the step 1081 of initializing and the step 1085 of executing the desired light effect. These steps are shown on the figure as dashed rectangles and the method runs in a main loop 1084 (dotted line) until the user actively stops it 1087.

The step 1078 of choosing the desired light effect can be performed by the user 1075 choosing an effect 1079 on a light controller 1076, which can comprise a "profile" of the projecting light fixture 1001, where the "profile" comprises a list of all available light effects. The light effects can be different combinations of the beam shaping patterns of the beam shaping object, for instance the light patterns shown in FIGS. 3 and 5 and/or an animation effects combining at least some of the different beam shaping patterns at the beam shaping in such way that a human observed will able to see an animation effect provided by the beam shaping patterns. The light effects can be displayed to the user as a macro or an effect channel on a screen of the light controller 1076, where the user is able to pick an effect, for the projecting light fixture 1001. The light controller converts the selected effect to a value that the projecting light fixture can interpret as a light effect. This conversion can be done using the "profile" of the projecting light fixture, where each light effect is mapped to a specific value, which uniquely identifies the light effect. The step of choosing the desired light effect comprises also the step of transmitting 1080 the specific value to the projecting light fixture 1001. In the illustrated embodiment the light controller performs these steps by transmitting the data encoded according to the different protocols, which is known in the art of stage lighting for instance any of the protocols mentioned in the description of the FIG. 1.

The initialization step 1081 can be performed by the projecting light fixture 1001 and comprises the steps of looking up 1082 and setting up the effect parameters 1083. First the projecting light fixture looks up the light effect parameters 1082 in a predefined memory section 1077. The location of each beam shaping pattern on the beam shaping object is predefined by the layout of the beam shaping object and it is possible to determine the position of the beam shaping patterns inside the source light beams based on the synchronization signal 1043. Therefore the projecting light fixture will be able to determine if there is a beam shaping pattern, in the source light beam, and which beam shaping pattern it is. The light fixture will start spinning the beam shaping object (107, 207, 407, 607, 707, 807, 907 in the previous figures) at a speed defined by the loaded effect parameters 1083. The next step 1085 of executing the effect can be performed by the projecting light fixture 1001 going into a loop 1085, where a synchronization signal is obtained 1043 and based on the synchronization signal the controller it adjusts the rotational speed of the beam shaping object 1090 if the rotational speed has drifted away from the speed defined in the effect parameters 1083. Afterwards the light projecting fixture will toggle the LEDs between the LED on-period and LED off-period 1086 depending on the synchronization signal 1043, and the effect parameters loaded from the memory 1077. These LED on-periods and LED off-periods results in a number of flashes which in combination with the rotating beam shaping object (107, 207, 407, 607, 707, 807, 907 in the previous figures), will produce the light effects as described previously. The projecting light fixture will stay in this loop until it is notified otherwise. This could be done by the user choosing another effect 1078, the user stopping the effect 1087 on the light controller 1076 which then transmit 1080 a stop command to the projecting light fixture encoded according to the different protocols, which is known in the art of stage lighting, or the projecting light fixture can identify an irregularity in the synchronization signal 1043, and terminate the effect. Both the two latter actions terminate the main loop 1084 as well.

Figure 11:
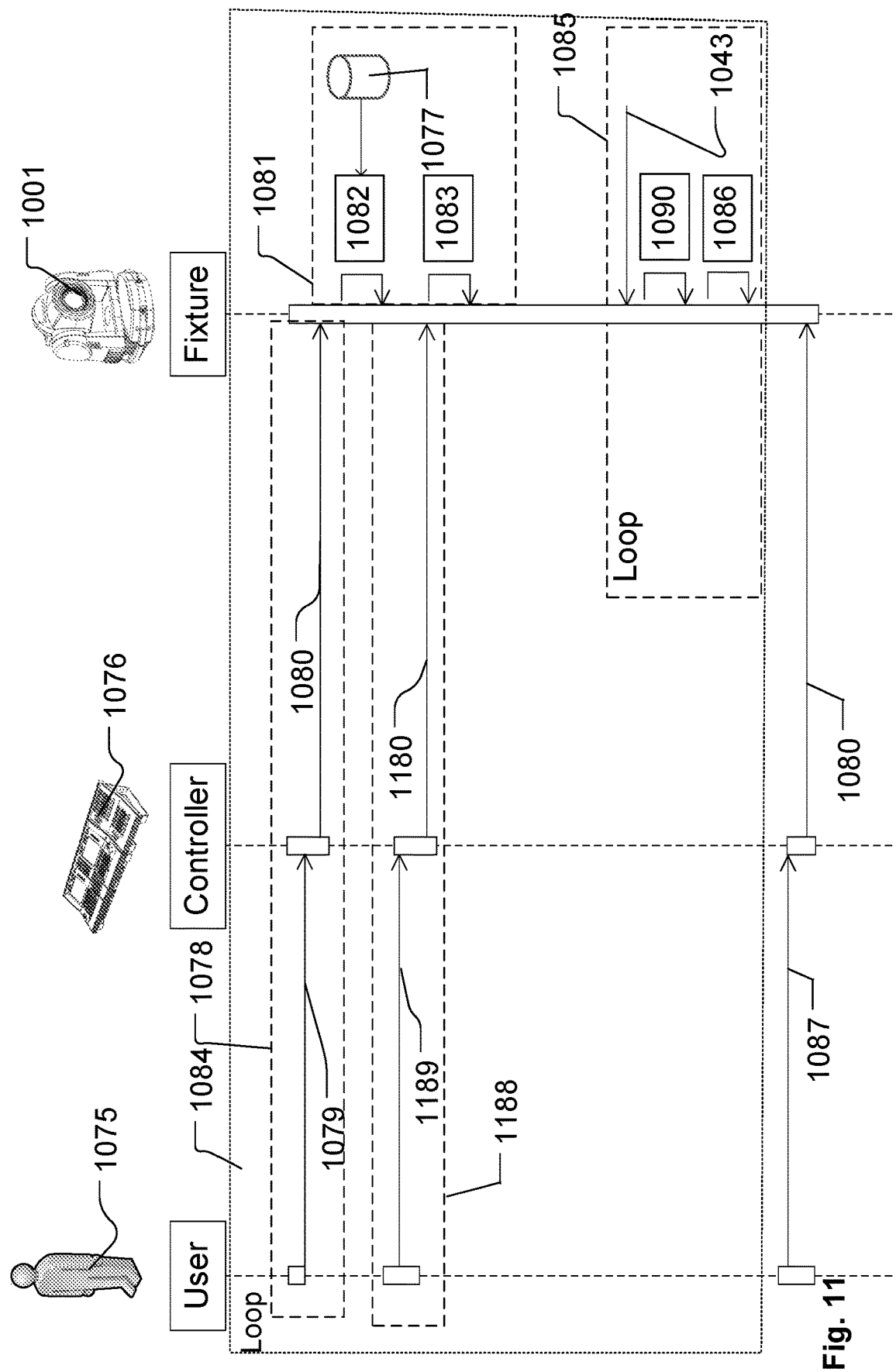

FIG. 11 illustrates another sequence diagram of the method according to the present invention. This method comprises the same steps as the method illustrated by the simplified sequence diagram illustrated in FIG. 10 and similar steps providing similar effects or functions have, in FIG. 11, been given the same reference number as in FIG. 10 and will not be described in detail. Furthermore the methods illustrated in FIG. 11 comprise the step of reconfiguring the parameters of the chosen light effect 1188. These steps are shown on the figure as dashed rectangles and the method runs in a main loop 1084 (dotted line) until the user actively stops it 1087.

When the user 1075 has chosen a light effect 1078 the light projecting fixture 1001 performs the initializing step 1081 as described in FIG. 10. The light projecting fixture then enters a loop 1085 as described in FIG. 10.

When the user 1075 has chosen a light effect 1078 the user can change the effect parameters in step 1188. These effect parameters 1189 can for instance be the duration of the LED on-period which controls how long time the LED is on, when each of the beam shaping patterns are in the source light beam. A long LED on-period results in an effect where the beam shaping patterns are stretched like the ones illustrated in FIGS. 3g, 3h and 5e and a short LED on-period results in a sharp image of the beam shaping patterns like the ones illustrated in FIG. 3a-3f.

Another effect parameter can be the LED shutter frequency in relation to the rotation speed of the beam shaping object which is used to choose, which beam shaping patterns that are in the source light beam when the LED is on. If the shutter frequency is at max, then the LED on-period will match all of the beam shaping patterns of the beam shaping object, and if the shutter frequency is at half, the LED on-period will match every other beam shaping patterns of the beam shaping object. Further the shutter frequency can allow an irregular frequency which allows the user to choose exactly which beam shaping patterns to match with the LED on-period which makes it possible to combine all the different beam patterns.

Yet another effect parameter can be the start-time of the LED on-period which controls when the LED are the turn on when the beam shaping pattern is positioned in the source light beam. This makes it possible to "move" the beam shaping pattern inside the source light beam like it is illustrated in FIG. 3d. The default value of this parameter could be defined with the beam shaping pattern located in the center of the source light beam. A reduction of the start-time will then result in the shift of the beam shaping pattern to one side, and the advancement of the start-time will result in the beam shaping pattern moving to the opposite side.

The user can also adjust the rotational speed of the beam shaping object. This affects how the effect is interpreted by the human eye. A high rotational speed allows the user to combine the different beam shaping patterns as seen in FIGS. 3c, 5c and 5d. A low rotational speed allows the user to create animations on the target surface because the human eye interpret the position of the different beam shaping patterns as a movement as described in FIG. 6.

When the user 10 has reconfigured the effect parameter the light controller 1076 converts the selected effect to a value that the projecting light fixture can interpret as a light effect. The step of reconfiguring the light effect also comprises the step of transmitting 1080 the specific value to the projecting light fixture 1001. In the illustrated embodiment the light controller performs these steps by transmitting the data encoded according to the different protocols, which is known in the art of stage lighting for instance any of the protocols mentioned in the description of the FIG. 1. When the projecting light fixture receives the reconfiguration the projecting light fixtures sets up the effect parameters 1083 and enters a loop 1085 as described in FIG. 10.

The projecting light fixture will stay in the loop 1085 until the user 1075 changes the light effect 1078 on the light controller 1076, changes the light effect parameters 1188, or the user decides to stop the effect 1087 using the light controller which then transmits a stop-signal encoded using the different protocols, which is known in the art of stage lighting.

Figure 12:
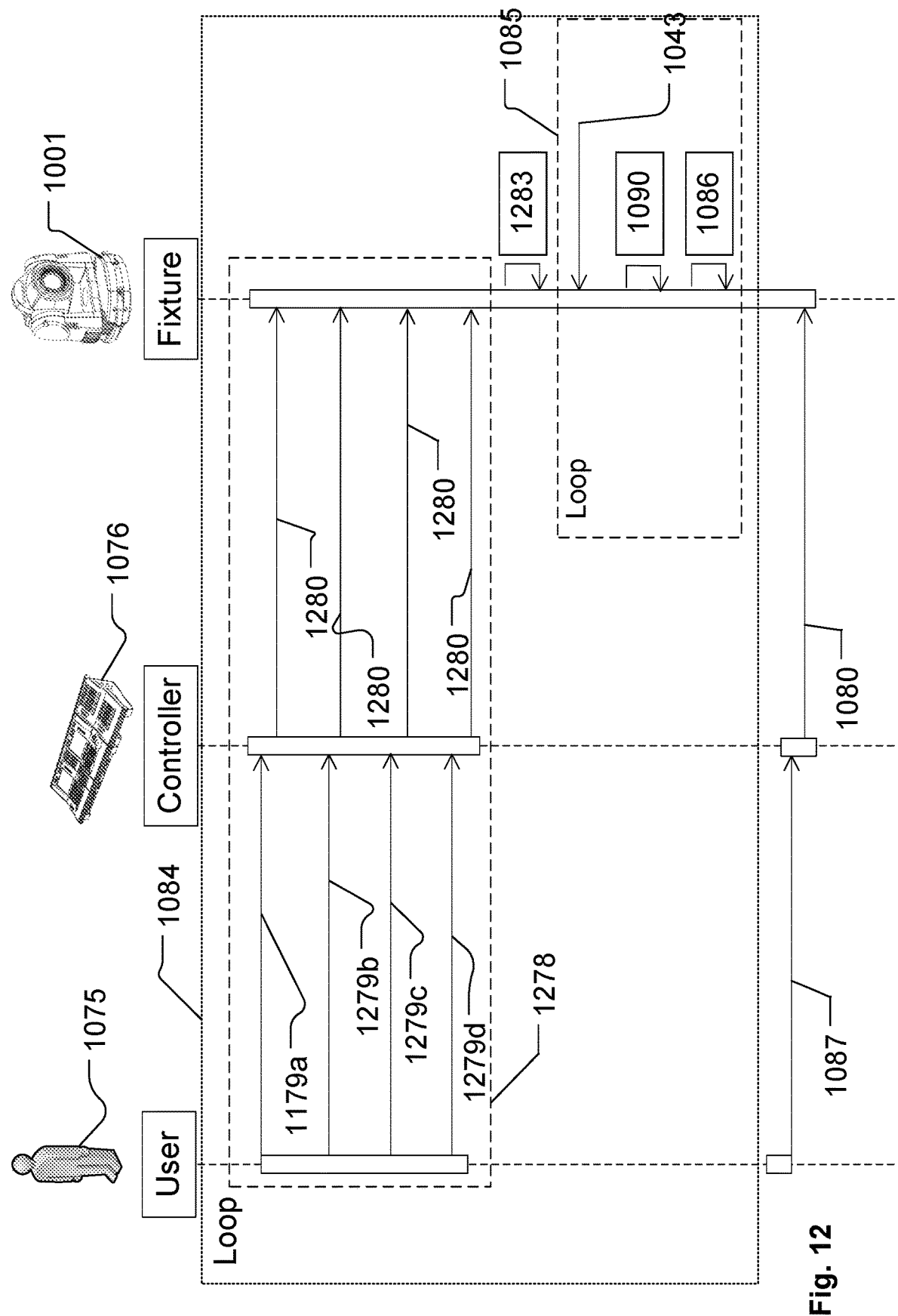

FIG. 12 illustrates a simplified sequence diagram of another embodiment of the method according to the present invention. The method comprises the same steps as the simplified sequence diagram illustrated in FIG. 10 and similar steps providing similar effects or functions have, in FIG. 12, been given the same reference number as in FIG. 10 and will not be described in detail. Furthermore FIG. 12 also comprises the step 1278 of manually entering the effect parameters. These steps are shown on the figure as dashed rectangles and the method runs in a main loop 1084 (dotted line) until the user actively stops it 1087.

In this embodiment the step 1278 of choosing a desired light effect can be performed by the user 1075 setting up a number of light effect parameters e.g. LED shutter frequency 1279a, duration of the LED on-period 1279b, start-time of the LED on-period 1279c, and the rotational speed of the beam shaping object 1279d on the light controller 1076. All these light effect parameters are described in FIG. 11. The light controller transmits 1280 the light effect parameters to the projecting light fixture 1001 using the different protocols, which is known in the art of stage lighting. The projecting light fixture sets up the light effect parameters 1283 and enters a execution loop 1085.

The projecting light fixture will stay in the loop 1085 until the user changes the light effect parameters 1188, or the user decides to stop the effect 1087 using the light controller which then transmits a stop-signal encoded using the different protocols, which is known in the art of stage lighting.

The patent application relates also to a light fixture and method according to the following points:

1. A projecting light fixture comprising:
   at least one LED generating at least one source light beam, where said source light beam propagates along a primary optical axis;
   a controller configured to control said at least one LED;
   a projecting system positioned along said primary optical axis, said projecting system collects at least a part of said source light beam and projects said light along said primary optical axis;
   a beam shaping object arranged between said LED and said projecting system, said beam shaping object comprises a least a first beam shaping pattern and a second beam shaping pattern, where said first beam shaping pattern and said second beam shaping pattern are different; said beam shaping object is rotatable in relation to said at least one source light beam and said first beam shaping patter and said second beam shaping pattern can be arranged in said source light beam by rotating said beam shaping object in relation to said at least one source light beam;

an actuator configured to continuously rotate said beam shaping object in relation to said source light beam in order to alternately arrange said first beam shaping pattern and said second beam shaping pattern in said at least one source light beam;

a synchronizer configured to provide a synchronizing signal indicative of at least one of the following parameters:

the rotation speed of said beam shaping object;

the angular position of said beam shaping object; and the position of said first beam shaping pattern in relation to said source light beam; and the position of said second beam shaping pattern in relation to said source light beam;

and wherein said controller is configured to toggle said at least one LED between a LED on-period and a LED off-period based on said synchronizing signal, where said at least one LED is turned on in said on-period and is turned off in said off-period.

2. The projecting light fixture according to point 1 wherein said controller is configured to synchronize said LED on-period with the rotation of said beam shaping object such that said LED on-period is active when at least one of said beam shaping patterns are arranged in said source light beam.

3. The projecting light fixture according to any one of points 1-2 wherein said controller is configured to adjust the duration of said LED on-period based on said synchronizing signal.

4. A projecting light fixture according to any one of points 1-3 wherein said controller is configured to adjust the duration of said on-period based on an input signal, said input signal is indicative of a duration parameter.

5. A projecting light fixture according to any one of points 1-4 wherein said controller is configured to adjust the starting time of said on-period based on said synchronizing signal.

6. A projecting light fixture according to any one of points 1-5 wherein said controller is configured to adjust the starting time of said on-period based on an input signal indicative of a time-off set parameter.

7. A projecting light fixture according to any one of points 1-6 wherein said beam shaping object comprises a non-shaping section arranged between said first beam shaping pattern and said second beam shaping pattern, said non-shaping section having an extent at least at big as said source light beam.

8. A projecting light fixture according to any one of points 1-7 wherein said beam shaping object comprises a transparent section arranged between said first beam shaping pattern and said second beam shaping pattern, said transparent section having an extent at least as big as said source light beam.

9. A projecting light fixture according to any one of points 1-8 wherein said synchronizer comprises:

a first identifier configured to indicate the position of said first beam shaping pattern in relation to said source light beam; and a second identifier configured to indicate the position of said second beam shaping pattern in relation to said beam shaping object;

where said synchronizer provides said synchronizing signal based on said first identifier and said second identifier.

10. A method of creating light effects, said method comprises the steps of:

generating a source light beam propagating along an optical axis using at least one LED;

continuously rotating a beam shaping object around an axis substantially parallel with said optical axis; where said beam shaping object comprises at least a first beam shaping pattern and a second beam shaping pattern where said first beam shaping pattern and said second beam shaping pattern are different, whereby said first beam shaping pattern and said second beam shaping pattern are alternately arranged inside said light beam during said continuously rotation of said beam shaping object;

obtaining at least one synchronization signal indicative of at least one of the following parameters:

the rotation speed of said beam shaping object;

the angular position of said beam shaping object;

the position of said first beam shaping pattern in relation to said source light beam; and the position of said second beam shaping pattern in relation to said source light beam;

toggling said at least one LED between a LED on-period and a LED off-period, where said at least one LED is turned on in said LED on-period and is turned off in said LED off-period; where said toggling is based on said synchronization signal.

11. The method according to point 10 wherein said step of toggling said at least one LED comprises the step of adjusting the duration of at least one of said LED on-periods.

12. The method according to any one of points 10-11 wherein said step of continuously rotating said beam shaping object comprises the step of adjusting the speed of rotation of said beam shaping object.

13. The method according to any one of the points 10-12 where said step of obtaining said synchronization signal comprises a step of indicating when each of said first beam shaping pattern and said second beam shaping pattern are about to enter said source light beam.

14. The method according to any one of points 10-13 wherein said step of rotating said beam shaping object comprises the step of rotating said beam shaping object at a rotating speed alternately arranging said beam shaping patterns in said source light beam at a speed faster than a human can pensive as different images.

15. The method according to any one of points 10-13 wherein said step of rotating said beam shaping object comprises the step of rotating said beam shaping object at a rotating speed alternately arranging said beam shaping patterns in said source light beam at a speed slower than a human can pensive as different images.

The invention claimed is:

1. A projecting light fixture comprising:

at least one LED generating at least one source light beam, where said at least one source light beam propagates along a primary optical axis;

a projecting system positioned along said primary optical axis, said projecting system collects and projects at least a part of said source light beam along said primary optical axis;

an optical gate arranged between said at least one LED and said projecting system, said at least one source light beam being concentrated at said optical gate;

a beam shaping object arranged between said at least one LED and said projecting system, said beam shaping object comprising a least a first beam shaping pattern and a second beam shaping pattern, where said first beam shaping pattern and said second beam shaping pattern are different, said beam shaping object is rotatable in relation to said at least one source light beam, and said first beam shaping pattern and said second beam shaping pattern can be arranged in said at least one source light beam by rotating said beam shaping object in relation to said at least one source light beam;

an actuator configured to continuously rotate said beam shaping object in relation to said at least one source light beam in order to alternately arrange said first beam shaping pattern and said second beam shaping pattern in said at least one source light beam; and a controller configured to toggle said at least one LED between a LED on-period and a LED off-period, where said at least one LED is turned on in said LED on-period and is turned off in said LED off-period, such that said LED on-period is active when at least one of said beam shaping patterns are arranged in said at least one source light beam.

2. The projecting light fixture according to claim 1, wherein said beam shaping object comprises a transparent section arranged between said first beam shaping pattern and said second beam shaping pattern, said transparent section having an extent at least as big as said at least one source light beam, and said controller being configured to activate said LED off-period when said transparent section is arranged in said at least one source light beam.

3. The projecting light fixture according to claim 2, wherein said transparent section is formed as an open section through which said at least one source light beam can pass unaffected.

4. The projecting light fixture according to claim 2, wherein said actuator is configured to stop said beam shaping object in a position where said transparent section is arranged in said at least one source light beam and said controller is configured to activate said LED on-period when said beam shaping object is arranged in said position where said transparent section is arranged in said at least one source light beam.

5. The projecting light fixture according to claim 1, wherein said beam shaping object comprises a plurality of copies of at least one of the beam shaping patterns and said controller is configured to activate said LED on-period when said plurality of copies of said beam shaping patterns are arranged in said at least one source light beam.

6. The projecting light fixture according to claim 5, wherein said plurality of copies of said at least one of the beam shaping patterns are arranged at different angular positions in relation to a rotation axis of the beam shaping object.

7. The projecting light fixture according to claim 1, wherein said actuator is configured to rotate said beam shaping object at a rotation speed alternately arranging said beam shaping patterns in said at least one source light beam at a speed faster than a human can perceive.

8. The projecting light fixture according to claim 7, wherein said beam shaping patterns are alternately arranged in said at least one source light beam at a rate faster than 100 frames per second.

9. The projecting light fixture according to claim 1, wherein said controller and said actuator are configured to stop the rotation of the beam shaping object such that one of said beam shaping patterns is arranged in said at least one source light beam.

10. The projecting light fixture according to claim 1, wherein said controller is configured to adjust a starting time of said on-period based on an input signal indicative of a time-off set parameter.

11. The projecting light fixture according to claim 1, wherein said controller is configured to adjust a duration of said on-period based on an input signal, said input signal being indicative of a duration parameter.

12. The projecting light fixture according to claim 1, wherein said controller is configured to synchronize said LED on-period with the rotation of said beam shaping object.

13. The projecting light fixture according to claim 1, wherein said beam shaping object comprises a non-shaping section arranged between said first beam shaping pattern and said second beam shaping pattern, said non-shaping section having an extent at least as big as said at least one source light beam.

14. The projecting light fixture according to claim 1, wherein a synchronizer is configured to provide a synchronizing signal indicative of at least one of the following parameters:
  a rotation speed of said beam shaping object;
  an angular position of said beam shaping object; and
  a position of said first beam shaping pattern in relation to said at least one source light beam; and
  a position of said second beam shaping pattern in relation to said at least one source light beam;
  and wherein said controller is configured to toggle said at least one LED between said LED on-period and said LED off-period based on said synchronizing signal.

15. The projecting light fixture according to claim 14, wherein said controller is configured to adjust a duration of said LED on-period based on said synchronizing signal.

16. The projecting light fixture according to claim 14, wherein said controller is configured to adjust a starting time of said on-period based on said synchronizing signal.

17. The projecting light fixture according to claim 14, wherein said synchronizer comprises:
  a first identifier configured to indicate the position of said first beam shaping pattern in relation to said at least one source light beam; and
  a second identifier configured to indicate the position of said second beam shaping pattern in relation to said beam shaping object;
  where said synchronizer provides said synchronizing signal based on said first identifier and said second identifier.

18. A method of creating light effects, said method comprising the steps of:
  generating a source light beam propagating along an optical axis using at least one LED;
  continuously rotating a beam shaping object around an axis substantially parallel with said optical axis, where said beam shaping object comprises at least a first beam shaping pattern and a second beam shaping pattern, where said first beam shaping pattern and said second beam shaping pattern are different, whereby said first beam shaping pattern and said second beam shaping pattern are alternately arranged inside said source light beam during said continuous rotation of said beam shaping object;
  concentrating said source light beam at an optical gate arranged between said at least one LED and a projecting system positioned along said optical axis, said projecting system collecting and projecting at least a part of said source light beam along said optical axis;

toggling said at least one LED between a LED on-period and a LED off-period, where said at least one LED is turned on in said LED on-period and is turned off in said LED off-period.

19. The method according to claim 18, wherein said beam shaping object comprises a transparent section arranged between said first beam shaping pattern and said second beam shaping pattern, said transparent section having an extent at least as big as said source light beam and said toggling said at least one LED comprises the step of activating said LED off-period when said transparent section is arranged in said source light beam.

20. The method according to claim 19, further comprising the steps of:
   stopping said beam shaping object in a position where said transparent section is arranged in said source light beam; and
   activating said LED on-period, when said beam shaping object is arranged in said position where said transparent section is arranged in said source light beam.

21. The method according to claim 18, wherein said beam shaping object comprises a plurality of at least one of the beam shaping patterns and said step of toggling said at least one LED between said LED on-period and said LED off-period comprises the step of activating said LED on-period when said plurality of at least one of the beam shaping patterns are arranged in said source light beam.

22. The method according to claim 18, further comprising the steps of:
   stopping said beam shaping device such that one of said beam shaping patterns is arranged in the source light beam; and
   activating said LED on-period when said beam shaping pattern is arranged in the source light beam.

23. The method according to claim 18, wherein said step of rotating said beam shaping object comprises the step of rotating said beam shaping object at a rotating speed alternately arranging said beam shaping patterns in said source light beam at a speed faster than a human can perceive as different images.

24. The method according to claim 18, wherein said step of rotating said beam shaping object comprises the step of rotating said beam shaping object at a rotating speed alternately arranging said beam shaping patterns in said source light beam at a speed slower than a human can perceive as different images.

25. The method according to claim 18, further comprising the steps of:
   obtaining at least one synchronization signal indicative of at least one of the following parameters:
   a rotation speed of said beam shaping object;
   an angular position of said beam shaping object;
   a position of said first beam shaping pattern in relation to said source light beam; and
   a position of said second beam shaping pattern in relation to said source light beam;
   wherein said step of toggling said at least one LED is performed based on said synchronization signal.

* * * * *